(12) United States Patent  (10) Patent No.: US 9,184,935 B2
Zheng  (45) Date of Patent: Nov. 10, 2015

(54) NETWORK COMMUNICATION METHOD AND NETWORK NODE DEVICE

(75) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 473 days.

(21) Appl. No.: 13/438,329

(22) Filed: Apr. 3, 2012

(65) Prior Publication Data

US 2012/0218994 A1   Aug. 30, 2012

Related U.S. Application Data

(63) Continuation of application No. PCT/CN2010/077456, filed on Sep. 29, 2010.

(30) Foreign Application Priority Data

Oct. 21, 2009  (CN) .......................... 2009 1 0180739

(51) Int. Cl.
H04L 12/46 (2006.01)
H04L 12/721 (2013.01)
H04L 12/701 (2013.01)
H04L 12/751 (2013.01)

(52) U.S. Cl.
CPC ............ *H04L 12/4633* (2013.01); *H04L 45/00* (2013.01); *H04L 45/02* (2013.01); *H04L 45/68* (2013.01)

(58) Field of Classification Search
CPC .... H04L 45/507; H04L 45/68; H04L 12/4633
See application file for complete search history.

(56) References Cited

U.S. PATENT DOCUMENTS

| 7,292,575 | B2* | 11/2007 | Lemieux et al. ............... 370/392 |
| 7,436,782 | B2* | 10/2008 | Ngo et al. ...................... 370/254 |
| 7,440,405 | B2* | 10/2008 | Hsieh et al. .................... 370/235 |
| 7,653,050 | B2* | 1/2010 | Brahim .......................... 370/353 |
| 7,668,178 | B2* | 2/2010 | Martini et al. ............ 370/395.53 |
| 7,782,841 | B2* | 8/2010 | Rampal et al. ................. 370/352 |

(Continued)

FOREIGN PATENT DOCUMENTS

| CN | 1722726 A | 1/2006 |
| CN | 101001196 A | 7/2007 |

(Continued)

OTHER PUBLICATIONS

IEEE Standard 802.01 ag™—2007 for Local metropolitan area networks—Virtual Bridged Local Area Networks; Amendment 5: Connectivity Fault Management; IEEE Computer Society (Amendment to IEEE Std 802.1Q™—2005 as amended by IEEE Std 802.1ad™—2005 and IEEE Std 802.1ak™—2007) (260 pgs.).

(Continued)

*Primary Examiner* — Gregory Sefcheck
(74) *Attorney, Agent, or Firm* — Brinks Gilson & Lione

(57) ABSTRACT

A network communication method includes: allocating a pseudo wire (PW) label and/or an Ethernet (ETH) label through a layer 2 label allocation protocol; and performing data communication according to the allocated PW label and/or the allocated ETH label. According to the embodiments of the present invention, the label is allocated through the layer 2 label allocation protocol, thus maintaining the node device as a layer 2 device, meanwhile implementing label allocation, and reducing the complexity and improvement cost of network access.

17 Claims, 14 Drawing Sheets

(56) References Cited

U.S. PATENT DOCUMENTS

| | | | |
|---|---|---|---|
| 7,796,594 B2* | 9/2010 | Melman et al. | 370/389 |
| 7,894,439 B2* | 2/2011 | Yoshimi | 370/392 |
| 8,009,558 B2* | 8/2011 | Ward et al. | 370/229 |
| 8,117,338 B2* | 2/2012 | Ould-Brahim | 709/242 |
| 8,181,009 B2* | 5/2012 | Watts et al. | 713/151 |
| 8,238,347 B2* | 8/2012 | DeSanti et al. | 370/395.5 |
| 8,396,945 B2* | 3/2013 | Damm et al. | 709/220 |
| 8,531,941 B2* | 9/2013 | Sajassi et al. | 370/219 |
| 2005/0094636 A1* | 5/2005 | Lee et al. | 370/389 |
| 2005/0213513 A1* | 9/2005 | Ngo et al. | 370/254 |
| 2006/0146832 A1* | 7/2006 | Rampal et al. | 370/395.5 |
| 2007/0206607 A1 | 9/2007 | Chapman et al. | |
| 2007/0280267 A1* | 12/2007 | Ould-Brahim | 370/395.53 |
| 2007/0286090 A1 | 12/2007 | Rusmisel et al. | |
| 2008/0159140 A1* | 7/2008 | Robinson et al. | 370/232 |
| 2008/0170578 A1* | 7/2008 | Ould-Brahim | 370/401 |
| 2009/0049175 A1 | 2/2009 | Finn | |
| 2009/0245263 A1 | 10/2009 | Sato | |
| 2010/0103837 A1* | 4/2010 | Jungck et al. | 370/252 |
| 2010/0238791 A1* | 9/2010 | Duncan et al. | 370/216 |
| 2011/0026530 A1 | 2/2011 | Du et al. | |

FOREIGN PATENT DOCUMENTS

| | | |
|---|---|---|
| CN | 101326791 A | 12/2008 |
| CN | 101485163 A | 7/2009 |
| CN | 101552711 A | 10/2009 |
| WO | WO 2008/092357 A1 | 8/2008 |
| WO | WO 2009/051179 A1 | 4/2009 |

OTHER PUBLICATIONS

IEEE P802.1Qat/D3.2; dated Aug. 1, 2009; Draft Standard for Local and Metropolitan Area Networks—Virtual Bridged Local Area Networks—Amendment XX: Stream Reservation Protocol (SRP); IEEE Computer Society (110 pgs.).

IEEE Standard 802.3™ Telecommunications and information exchange between systems—Local and metropolitan area networks—Specific requirement; Part 3: Carrier sense multiple access with Collision Detection (CSMA/CD) Access Method and Physical Layer Specification: Section 1 dated Dec. 28, 2008 (671 pgs.); Section 2 Clause 21-33; and Annex 22A-33E ($3^{rd}$ printing—Jun. 22, 2010) (790 pgs.); Section 3 Clause 34-43; and Annex 36A-43C ($3^{rd}$ printing—Jun. 22, 2010) (315 pgs.); Section 4 Clause 44-55; and Annex 44A-55B ($3_{rd}$ printing—Jun. 22, 2010) (586 pgs.); and Section 5 Clause 56-74; and Annex 57A-74A ($3^{rd}$ printing—Jun. 22, 2010) (615 pgs.). (2,977 pgs. total).

International Search Report relating to International Application No. PCT/CN2010/077456; dated (mailed) Dec. 30, 2010, for Huawei Tech Co., Ltd. (3 pgs.).

Written Opinion of the International Searching Authority relating to International Application No. PCT/CN2010/077456; dated (mailed) Dec. 30, 2010, for Huawei Tech Co., Ltd. (6 pgs.).

First Chinese Office Action (Translation) of Chinese Application No. 200910180739.4; dated (mailed) Dec. 23, 2011; Chinese version included (18 pgs.).

* cited by examiner

| Octet group | Ethernet |
|---|---|
| 6 | Destination Address = 01-80-C2-00-00-22 |
| 6 | Source Address |
| 2 | Ethernet Type = xx- xx(MSRP) |
| x | ... |
| 1 | Label Management type |
| 6 | Ingress MAC Address |
| 2 | Data Path ID |
| 6 | Egress MAC Address |
| 1 | Label Type |
| 2 | Label |
| x | FEC(TLV) |
| x | ... |
| x | Pad |
| 4 | FCS |

FIG. 7

| Octet group | Ethernet |
|---|---|
| 6 | Destination Address = 01-80-C2-00-00-02 |
| 6 | Source Address |
| 2 | Ethernet Type =88-09 (slow protocols) |
| x | ... |
| 1 | Code = 0xFE |
| x | ... |
| 1 | Label Management type |
| 6 | Ingress MAC Address |
| 2 | Data Path ID |
| 6 | Egress MAC Address |
| 1 | Label Type |
| 2 | Label |
| x | FEC(TLV) |
| x | ... |
| x | Pad |
| 4 | FCS |

FIG. 8

| Octet group | Ethernet |
|---|---|
| 6 | Destination Address = 01-80-C2-00-00-02 |
| 6 | Source Address |
| 2 | Ethernet Type =88-09 (slow protocols) |
| x | Subtype = 0xFE |
| 1 | Code = 0xFE |
| x | ... |
| 1 | Label Management type |
| 6 | Ingress MAC Address |
| 2 | Data Path ID |
| 6 | Egress MAC Address |
| 1 | Label Type |
| 2 | Label |
| x | FEC(TLV) |
| x | ... |
| x | Pad |
| 4 | FCS |

FIG. 9

| Octet group | Ethernet |
|---|---|
| 6 | Destination Address |
| 6 | Source Address |
| 2 | EtherType = 0x88b5 or 0x88b6 or 0x88b7 |
| 1 | Protocol Type for external message |
| x | ... |
| 1 | Label Management type |
| 6 | Ingress MAC Address |
| 2 | Data Path ID |
| 6 | Egress MAC Address |
| 1 | Label Type |
| 2 | Label |
| x | FEC(TLV) |
| x | ... |
| x | Pad |
| 4 | FCS |

FIG. 10

NETWORK COMMUNICATION METHOD AND NETWORK NODE DEVICE

CROSS-REFERENCE TO RELATED APPLICATIONS

This application is a continuation of International Application No. PCT/CN2010/077456, filed on Sep. 29, 2010, which claims priority to Chinese Patent Application No. 200910180739.4, filed on Oct. 21, 2009, both of which are hereby incorporated by reference in their entireties.

FIELD OF THE INVENTION

Embodiments of the present invention relate to the field of network communications, and in particular, to a network communication method and a network node device.

BACKGROUND OF THE INVENTION

A pseudo wire (Pseudo Wires, PW) is a mechanism for carrying a key element of an emulation service from one PE (Provider Edge, provider edge) device to another or multiple other PE devices through a PSN (Packet Switch Network, packet switch network). Through tunnels on the PSN network, such as an IP (Internet Protocol, Internet protocol), an L2TP (Layer 2 Tunneling Protocol, layer 2 tunneling protocol) or an MPLS (Multiprotocol Label Switching, multiprotocol label switching), the PSN may transmit a data payload of multiple types of services by emulating multiple types of services such as an ATM (Asynchronous Transfer Mode, asynchronous transfer mode), TDM (Time Division Multiplexing, time division multiplexing), and Ethernet (Ethernet). FIG. 1 is a schematic diagram of a network reference model of a point-to-point pseudo wire. Two provider edge devices PE1 and PE2 provides customer edge (Customer Edge, CE) devices CE1 and CE2 that are connected to the PE1 and the PE2 with one or multiple PWs, so that corresponding CEs may communicate with each other on the PSN. An internal data service borne by the PW is invisible to a bearer network, that is, for the bearer network, a CE data stream is transparent. A local data unit (such as bit, cell or packet) reaching through an AC (Access Circuit, access circuit) is first encapsulated in a PW protocol data unit (PW-PDU), and then is transmitted in a lower-level bearer network through a PSN tunnel. The PE executes necessary encapsulation and de-encapsulation processes on the PW-PDU, and any other functions (functions such as sorting and timing) required by a PW service.

There are mainly three optional outer-layer tunnel modes for PW encapsulation, which are respectively an IP/UDP (User Datagram Protocol, user datagram protocol) mode, an L2TP mode and an MPLS mode. An access network and a metropolitan area Ethernet are generally layer 2 devices. If it is required to support PWE3 (pseudo wire emulation edge-to-edge, pseudo wire emulation edge-to-edge), not only a control plane of a layer 2 network node needs to be improved to upgrade the control plane to layer 3, but also a data plane of the layer 2 network node needs to be improved to upgrade the data plane to a layer supporting MPLS or IP, which brings high complexity to the access device and the metropolitan area Ethernet, and causes a high cost and poor scalability (Scalability).

SUMMARY OF THE INVENTION

Embodiments of the present invention provide a network communication method and a network node device, which may reduce the cost and complexity of an access device and a metropolitan area Ethernet device.

An embodiment of the present invention provides a network communication method, including: allocating a pseudo wire (PW) label and/or an Ethernet (ETH) label through a layer 2 label allocation protocol; and performing data communication according to the allocated PW label and/or the allocated ETH label.

An embodiment of the present invention provides a network node device, including a label allocation unit, configured to allocate a PW label and/or an ETH label through a layer 2 label allocation protocol; and a data communication unit, configured to perform data communication according to the allocated PW label and/or the allocated ETH label.

According to some embodiments of the present invention, the label is allocated through the layer 2 label allocation protocol, thus maintaining the node device as a layer 2 device, meanwhile implementing label allocation, and reducing the complexity and improvement cost of network access.

BRIEF DESCRIPTION OF THE DRAWINGS

To illustrate the technical solutions according to the embodiments of the present invention or in the prior art more clearly, accompanying drawings required for describing the embodiments or the prior art are introduced briefly in the following. Apparently, the accompanying drawings in the following description are only some embodiments of the present invention, and persons of ordinary skill in the art may further obtain other drawings from these accompanying drawings without creative efforts.

FIG. 7 to FIG. 10 are schematic diagrams of an embodiment of implementing a layer 2 label allocation protocol;

DETAILED DESCRIPTION OF THE EMBODIMENTS

In order to make the foregoing objectives, features, and advantages of the embodiments of the present invention more obvious and comprehensible, the embodiments of the present invention are further described in detail below with reference to the accompanying drawings and specific embodiments.

Figure 1:
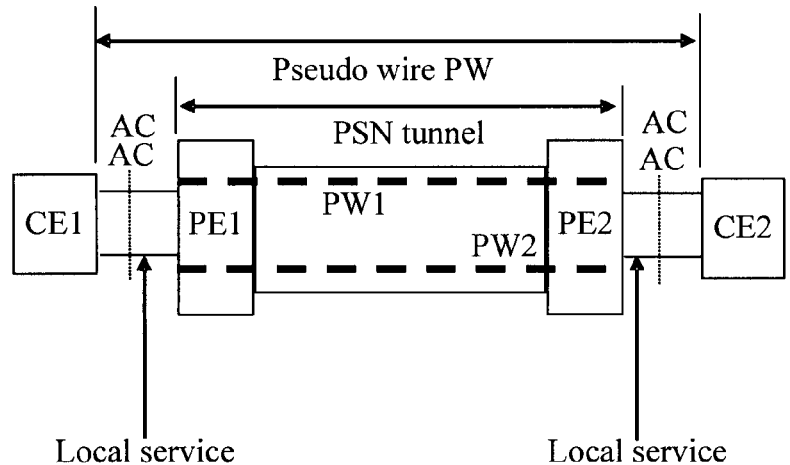
FIG. 1 is a schematic diagram of a network reference model of a point-to-point pseudo wire.
Figure 2:
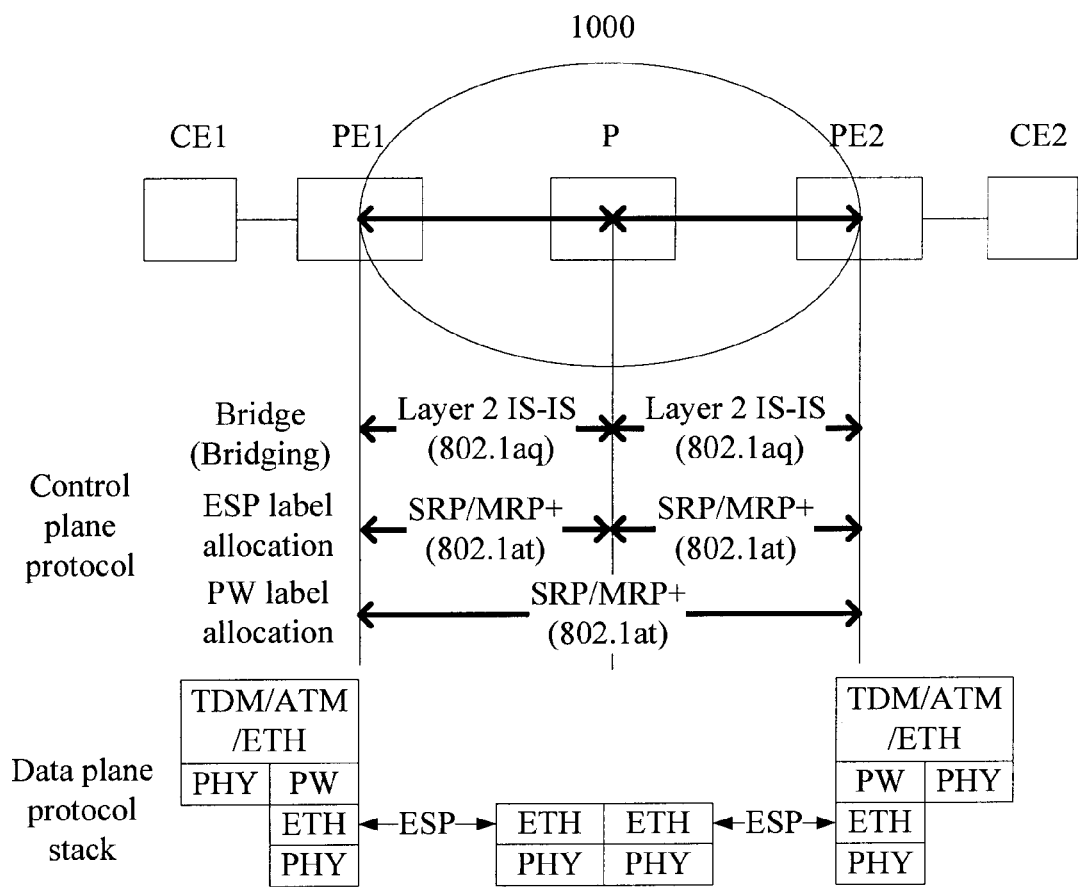
FIG. 2 is a schematic diagram of a communication network system that may apply an embodiment of the present invention.

FIG. 2 is a schematic diagram of a communication network system that may apply an embodiment of the present invention. In FIG. 2, a communication network system 1000 includes provider edge devices PE1 (a source node device) and PE2 (a terminal node device), and a P (Provider, provider) node device (an intermediate node device). In the following, the PE1 and the PE2 are collectively referred to as a PE. The PE node device and the P node device both use a layer 2 device, such as a layer 2 Ethernet device. The provider edge devices PE1 and PE2 are connected to customer edge devices CE1 and CE2 respectively. FIG. 2 illustrates two customer edge devices, two provider edge devices and one P node device, but the number of the devices that may apply the embodiment of the present invention is not limited to this specific embodiment, and may change according to specific applications.

On a control plane of the PE node device and the P node device, ETH label allocation may be implemented through a layer 2 label allocation protocol, so as to establish a corresponding EVP (Ethernet Virtual Path, Ethernet virtual path) and/or ESP (Ethernet Switched Path, Ethernet switched path). PW label allocation may also be implemented through the layer 2 label allocation protocol.

The EVP and the ESP refer to a transmission path formed by a series of relay nodes (that is, P/PE node based on Ethernet) transmitted on the basis of an Ethernet forwarding mechanism.

The EVP and the ESP use a forwarding mechanism based on the ETH label to forward a specific FEC (Forwarding Equivalence Class, forwarding equivalence class) packet. The FEC defines a group of ATM cells, TDM data, ETH frames or IP packets which, from the perspective of a forwarding action, have a same forwarding property, or a same mapping relation of mapping to one specific EVP/ESP.

The establishment of the EVP and/or ESP may enable the Ethernet to provide a traffic engineering (Traffic Engineering) ability, so that the Ethernet has abilities of path management and QoS (Quality of Service, quality of service) assurance, thus achieving operation and maintenance of a provider. Compared with statically configuring the EVP and/or ESP, the dynamic establishment of the EVP and/or ESP through layer 2 signaling does not require the provider to dispatch persons to configure EVP and/or ESP data for each node of the network device, which may dramatically reduce the maintenance cost of the provider and decrease misconfiguration caused by human factors easily caused by the static configuration.

Through further employing PW over ETH (PWoE, the PW is borne on the Ethernet) or PW over Trill (the PW is borne on the Trill), flooding and an MAC (Media Access Control, media access control) address learning function are disabled on a data plane of the PE node device and the P node device, and the ESP and/or the EVP is established on an ETH layer and/or a Trill (TRansparent Interconnection of Lots of Links, transparent interconnection of lots of links) layer. This feature particularly benefits an access network or a metropolitan area Ethernet. Because the access network or the metropolitan area Ethernet is generally a layer 2 device, if it is required to support a current PWE3, the data plane of the layer 2 network node needs to be improved to upgrade the data plane to a layer supporting MPLS, an L2TP, or a UDP/IP, which increases the upgrade cost and complexity of the device. The PW is directly borne on the Ethernet, which may maintain the layer 2 data plane of the current device unchanged, thus effectively protecting an investment for an original device, and reducing the complexity and cost of the device.

The EVP is identified and determined by an EVP ID, the ESP is identified by an ESP ID (in the following, the EVP ID and the ESP ID may be collectively referred to as "path identification information"), and different EVPs and ESPs correspond to different ETH labels. On the same EVP or ESP, the ETH label maintains unchanged at each hop between the PE1 and the PE2.

Figure 3:
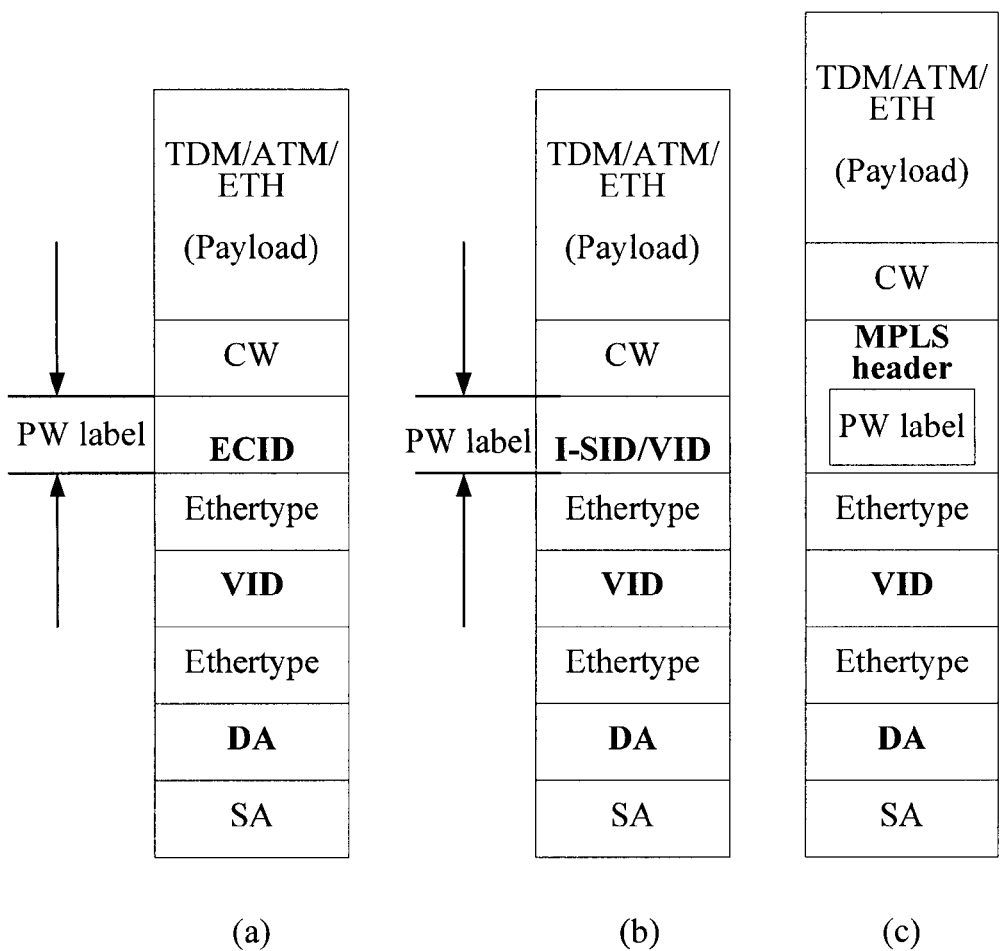
FIG. 3 to FIG. 5 are schematic diagrams of a protocol stack.
Figure 4:
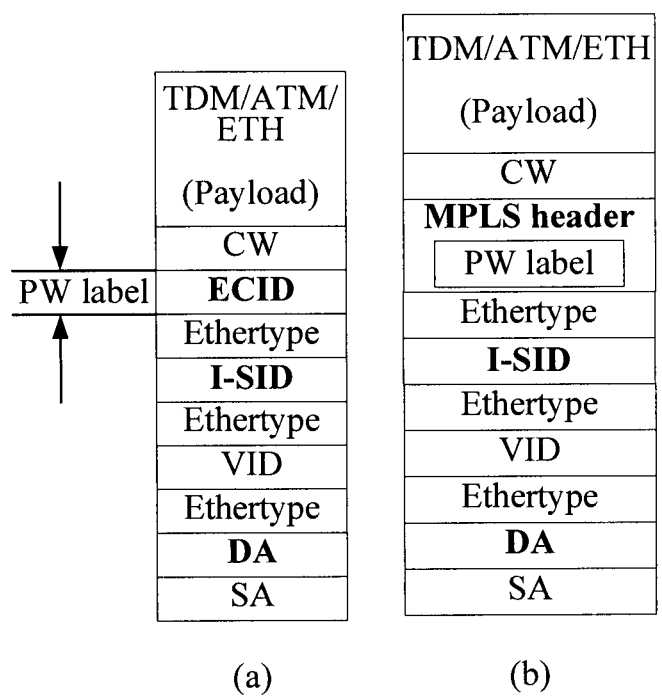

FIG. 3 and FIG. 4 are schematic diagrams of a PWoE protocol stack. For PWoE, the ETH label is formed by a VID (VLAN IDentifier, virtual local area network identifier), or formed by an MAC address and the VID (as shown in FIG. 3), or formed by an I-SID (I-component Service Identifier, I-component service identifier), or formed by the MAC address and the I-SID (as shown in FIG. 4). In the following, the VID or the I-SID may be referred to as "label identification information".

Figure 5:
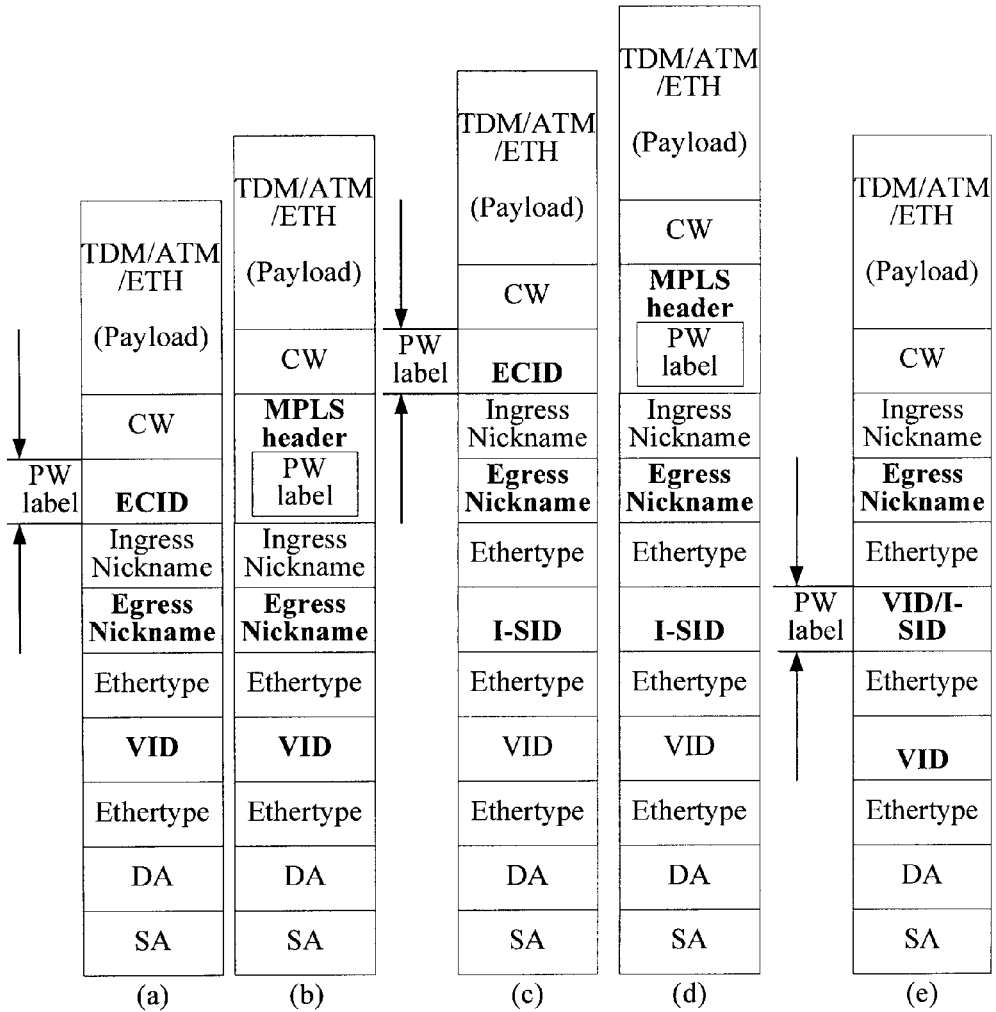

FIG. 5 is a schematic diagram of a PW over Trill protocol stack. For PW over Trill, as shown in FIG. 5, the ETH label is formed by a VID, or by a Nickname of a Trill message header and a VID, or formed by an I-SID, or by a Nickname of a Trill packet header and an I-SID. The MAC address may be a unicast DA (Destination Address, destination address) or a multicast MAC address. The nickname (nickname) may be an Ingress Nickname (ingress nickname) and/or an Egress Nickname (egress nickname).

An EVC (Ethernet Virtual Connection, Ethernet virtual connection) is a connection between two or among multiple UNIs (User Network Interface, user network interface). The UNI is a boundary point of networks and is located between the customer device CE and the provider network device PE.

The PW may be an MPLS PW or an EVC. The PW may be identified by a PW ID, and different PW IDs correspond to different PW labels.

As shown in FIG. 3, part (a), FIG. 4, part (a), FIG. 5, part (a) and FIG. 5, part (c), the PW label adopts an ECID (Emulated Circuit Identifier, emulated circuit identifier). As shown in FIG. 3, part (b) and FIG. 5, part (e), the PW label adopts an I-SID/a VID. The PW is equivalent to the EVC, the PW ID is equivalent to the EVC ID, and the EVC ID generally corresponds to a corresponding I-SID/VID. Compared with a PW based on the MPLS, using the EVC as the PW is more simplified on the protocol layer, and is easier to be implemented on a layer 2 device.

Alternatively, as shown in FIG. 3, part (c), FIG. 4, part (b), FIG. 5, part (b) and FIG. 5, part (d), the PW label adopts an MPLS label, and the PW ID is equivalent to an MPLS VC (Virtual Connection, virtual connection) ID.

Figure 6:
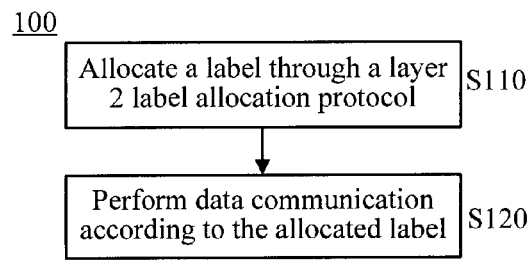
FIG. 6 is a flow chart of a network communication method according to an embodiment of the present invention.

FIG. 6 is a flow chart of a network communication method according to an embodiment of the present invention. The method 100 shown in FIG. 6 may be executed by, for example, the communication network system 1000 of FIG. 2. The method 100 of FIG. 6 is described in the following with reference to the communication network system 1000 of FIG. 2.

As shown in FIG. 6, in S110 of the network communication method 100, labels are allocated through a layer 2 label allocation protocol, such as a PW label or an ETH label. Label allocation may be performed on a control plane of a PE device.

For the foregoing "layer 2 label allocation protocol", FIGS. 7 to 10 illustrate some embodiments of implementing the layer 2 label allocation protocol. It should be noted that, the embodiments of the present invention are not limited to those specific embodiments, and may adopt other types according to requirements.

FIG. 7 illustrates a schematic diagram of implementing the layer 2 label allocation protocol by extending a layer 2 resource reservation protocol (for example, an SRP: Stream Reservation Protocol, stream reservation protocol) or a layer 2 registration protocol (for example, an MRP: Multiple Registration Protocol, multiple registration protocol).

The MRP includes an MMRP (Multiple MAC Registration Protocol, multiple MAC registration protocol) and an MVRP (Multiple VLAN Registration Protocol, multiple VLAN registration protocol); the SRP includes an MSRP (Multiple Stream Registration Protocol, multiple stream registration protocol); an MMRP destination address (destination address) is 01-80-C2-00-00-20; an MVRP destination address is 01-80-C2-00-00-21; and an MSRP destination address is 01-80-C2-00-00-22.

EtherType (Ethernet type) is used to indicate a protocol type of an Ethernet frame payload, where an MMRP EtherType is 88-F6, an MVRP EtherType is 88-F5, and an MSRP EtherType is to be determined by a standards organization.

FIG. 8 illustrates a schematic diagram of implementing a layer 2 label allocation protocol by extending an Ethernet OAM (Operation Administration and Maintenance, operation administration and maintenance) cell. The Ethernet OAM is part of the 802.3 standard of Institute of Electrical and Electronics Engineers (Institute of Electrical and Electronics Engineers, IEEE), and the label allocation may also be implemented by extending the Ethernet OAM for the layer 2 label allocation protocol. As shown in FIG. 8, a layer 2 label allocation message is indicated by a Code (code) field of the Ethernet OAM. An Ethernet type (Ethernet type) field is set to 88-09, which indicates a slow protocol (slow protocol); a Subtype (subtype) field is set to 0x03, which indicates a format of the Ethernet OAM. A Reserved (reserved) field (whose value is 05-FD, of the Code field may be used to indicate that an OAM packet includes a parameter (for example, label or address) related to the label. The parameter related to the label may be placed in a data (data) field of the OAM packet.

FIG. 9 illustrates a schematic diagram of implementing a layer 2 label allocation protocol by extending a subtype (subtype) field of the slow protocol. A layer 2 label allocation message is indicated by the subtype. The Ethernet type field is set to 88-09, which indicates a slow protocol (slow protocol). The subtype field is set to 0xFE, which is a generally extended slow protocol (generally extended slow protocol) format and indicates that a parameter (for example, label or address) related to the label is carried.

FIG. 10 illustrates a schematic diagram of implementing a layer 2 label allocation protocol by extending an EtherType (Ethernet type) field of an Ethernet frame. As shown in FIG. 10, the EtherType may be 0x88b5 or 0x88b6, which indicates that the EtherType is used in a local experimental (local experimental), or may be 0x88b7, which indicates that the EtherType is extended according to a protocol formulated by an external standards organization.

In FIGS. 7 to 10, a Label Management Type is used to indicate a management type of the label (label), for example, indicate that the message is used in label allocation, label modification or label deletion. The field may implement the extending method shown in FIG. 7 by extending an Attribute type (attribute) field of the MSRP.

In FIGS. 7 to 10, an Ingress MAC Address is an ingress MAC address (or an Ingress Nickname).

A Data Path ID field is a specific ID value, and a Data Path (data path) may be EVP/ESP/EVC/MPLS VC.

In the extending method shown in FIG. 7, the Ingress MAC Address (or the Ingress Nickname) and the Data Path ID may be carried by using a Stream ID (stream ID) field of the MSRP, where an MAC address sub-field of the stream ID field is used to carry an ingress MAC address (or an Ingress Nickname), and a unique ID (unique ID) sub-field of the stream ID field is used to carry a Data Path ID (for example, MPLS VC ID/EVC ID/EVP ID/ESP ID).

In FIGS. 7 to 10, an Egress MAC Address is an egress MAC address (or an Egress Nickname), and in the extending method shown in FIG. 7, the Egress MAC Address (or the Egress Nickname) may be carried by using a destination field of the MSRP.

In FIGS. 7 to 10, a Label Type is used to indicate a type of the label, which may indicate a type of the Data Path ID field and a type of a Label field, as shown in table 1. The label field is a specific label value. The Label Type may be located in any position. FIGS. 7 to 10 are for exemplary purpose only and are not intended to limit the scope of the embodiments of the present invention. In the extending method shown in FIG. 7, the label may be carried by using a VLAN Identifier field of the MSRP.

TABLE 1

| Label | Data Path ID Field | Label Type | Label Field |
|---|---|---|---|
| 0001-0000 | EVP ID | ETH Label = VID | VID |
| 0001-0001 | EVP ID | ETH Label = I-SID | I-SID |
| 0010-0000 | ESP ID | ETH Label = VID + Egress MAC Address | VID |
| 0010-0001 | ESP ID | ETH Label = VID + Egress MAC Address + Ingress MAC Address | VID |
| 0010-0010 | ESP ID | ETH Label = VID + Egress Nickname | VID |
| 0010-0011 | ESP ID | ETH Label = VID + Egress Nickname + Ingress Nickname | VID |
| 0010-0100 | ESP ID | ETH Label = I-SID + Egress MAC Address | I-SID |
| 0010-0101 | ESP ID | ETH Label = I-SID + Egress MAC Address + Ingress MAC Address | I-SID |
| 0010-0110 | ESP ID | ETH Label = I-SID + Egress Nickname | I-SID |
| 0010-0111 | ESP ID | ETH Label = I-SID + Egress Nickname + Ingress Nickname | I-SID |
| 0011-0000 | MPLS VC ID | PW Label = MPLS Label | MPLS Label |
| 0100-0000 | EVC ID | PW Label = ECID | ECID |
| 0100-0001 | EVC ID | PW Label = VID | VID |
| 0100-0010 | EVC ID | PW Label = I-SID | I-SID |

In FIGS. 7 to 10, an FEC is optional, is defined by using a TLV (type-length-value, type-length-value) mode, and may be set according to the RFC 4447 and RFC 5036 of IETF (Internet Engineering Task Force; Internet Engineering Task Force).

A Pad field is used for filling to ensure that an Ethernet frame has at least 42 bytes, and an FCS (frame check sequence, frame check sequence) comes last.

Back to the method 100 in FIG. 6, in S120 of the network communication method 100, after the PW label and/or the ETH label is allocated, data communication may be performed according to the allocated PW label and/or the allocated ETH label.

In this way, according to the method 100 of the embodiment of the present invention, a layer 2 structure of the current node device is still maintained, and then the label allocation may be implemented. It is only required to upgrade the control plane of the layer 2 network node device, the layer 2 data plane of the current device maintains unchanged, and the control plane is still maintained as the layer 2 structure, thus reducing the complexity and the improvement cost of network access.

In FIG. 6, according to an embodiment of the present invention, in the case that the ETH label is allocated through the layer 2 label allocation protocol, in S110, specifically, the PE node devices and the P node devices may first exchange layer 2 routing information with each other, and a layer 2 routing table is established according to the layer 2 routing information. Then, the PE may generate an ETH label allocation message according to the layer 2 label allocation protocol, where the ETH label allocation message includes a parameter (for example, ID/label, or address) related to the ETH label. The PE node devices and the P node devices transmit/forward the ETH label allocation message according to the layer 2 routing table, so as to complete the ETH label allocation. For example, in the case that the PE1 (a source) performs an allocation operation, the foregoing parameter related to the ETH label in the ETH label allocation message may include the label. In the case that the PE2 (a destination end) performs the allocation operation, the foregoing parameter related to the ETH label in the ETH label allocation message may include identification information used for allocating the ETH label. After the ETH label allocation is completed, in S120, the PE node devices and the P node devices establish the EVP and/or the ESP (Ethernet virtual path and/or Ethernet switched path) and a corresponding layer 2 forwarding table according to the layer 2 routing table and the ETH label, and perform data communication according to the established EVP and/or ESP.

In this way, during the implementation of the ETH label allocation and the establishment of the EVP and/or ESP, the node device is still maintained as a layer 2 device, thus reducing the complexity and improvement cost of the network access.

In the following, an embodiment corresponding to the method in FIG. 6 in the case of ETH label allocation is described with reference to the accompanying drawings and examples.

Figure 11:
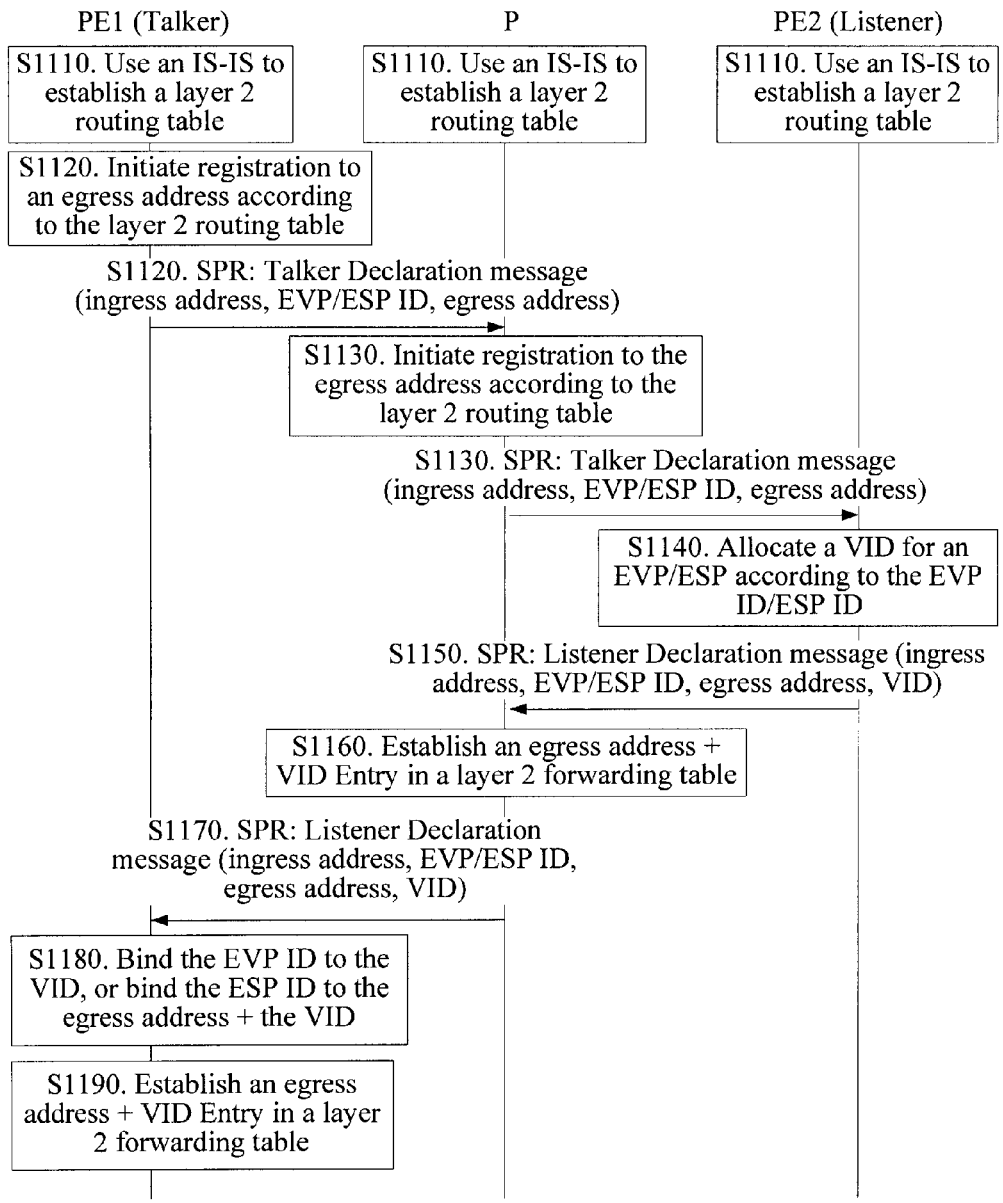
FIG. 11 to FIG. 13 are schematic diagrams of an embodiment of allocating an ETH label.

FIG. 11 illustrates a flow chart of a method 200 for allocating an ETH label by extending a layer 2 resource reservation protocol (for example, an SRP protocol).

As shown in FIG. 11, in the method 200, an EVP source node and/or an ESP source node sends an EVP ID and/or ESP ID (path identification information), and an EVP terminal node and/or an ESP terminal node allocates a VID or an I-SID, where the VID or the I-SID corresponds to the EVP ID and/or the ESP ID, thus singly forming the ETH label or further forming the ETH label together with an ESP egress MAC address. The EVP ID and the ESP ID are merely meaningful in one management field and belong to one specific MAC address (for example, an MAC address of an ESP source node). In a same MAC address, each EVP or ESP needs to use a unique value of the EVP ID or the ESP ID. The EVP ID or the ESP ID may have a one-to-one mapping relation with the FEC, and the EVP ID or the ESP ID may be totally the same with the VID allocated by the terminal node.

The layer 2 resource reservation protocol (for example, an SRP) is extended, and an ESP ingress MAC address (or an Ingress Nickname), an ESP ID/VID/I-SID and an ESP egress MAC address (or an Egress Nickname) are carried, through which one ESP is identified uniquely; or the layer 2 resource reservation protocol (for example, an SRP) is extended, and an EVP ingress MAC address (or an Ingress Nickname), an EVP ID/VID/I-SID and an EVP egress MAC address (or an Egress Nickname) are carried. It can be seen that, the ingress addresses or the egress addresses are layer 2 addresses. The function of a Talker Declaration message of the SRP is similar to that of a Path message of RSVP-TE (resource reservation setup protocol with traffic-engineering extensions, resource reservation setup protocol with traffic-engineering extensions), and a Listener Declaration message of the SRP is similar to a Resv message of the RSVP-TE.

Assume that a PE1 is an EVP/ESP source node or is referred to as an EVP/ESP ingress node (source node device), and a PE2 is an EVP/ESP destination end node or is referred to as an EVP/ESP egress node (terminal node device).

In S1110, the layer 2 information such as the MAC addresses, VIDs or I-SIDs of the nodes (such as PE/P) may be exchanged/shared to establish a layer 2 routing table.

Specifically, a control plane may disable an STP (Spanning Tree Protocol, spanning tree protocol), and use more highly flexible IS-IS (Intermediate System to Intermediate System routing protocol, intermediate system to intermediate system routing protocol) as a link state protocol, so as to update and publish layer 2 network topology information and to establish a layer 2 routing table. When the IS-IS is applied to a layer 2 network, an Ethernet node may adopt a PLSB (that is, ISIS-SPB link state protocol) or a Trill IS-IS, so as to use the layer 2 IS-IS to share the layer 2 information such as the MAC addresses, VIDs or I-SIDs of the layer 2 network nodes (for example, PE/P).

Taking the PLSB as an example, by utilizing a basic IS-IS function, each PLSB node uses a link state advertisement (LSA, Link-State Advertisement) to inform a directly adjacent node that which node the node is connected to and how to connect these nodes. The advertisement is published among all nodes that support the PLSB, therefore each node in one PLSB instance finally shares one common network topology (including a device MAC address and an I-SID). Once all the nodes learn the topology, each node applies an SPF (Shortest Path First, shortest path first) algorithm, and updates a shortest path obtained through calculation into the layer 2 routing table. In this way, every node establishes a point-to-multipoint shortest path tree with the current node as a root node and from the root node to all other nodes in the network.

In S1120, when it is required to establish an EVP/ESP from the PE1 to the PE2, an EVP/ESP ingress is an MAC address of the PE1, an EVP/ESP egress is an MAC address of the PE2, and an EVP ID/ESP ID may be a certain VID value shared by the IS-IS in the network. Then, the PE1 initiates a layer 2 registration message Talker Declaration (corresponding to the "ETH label allocation message"), which carries an EVP/ESP ingress MAC address, EVP/ESP ID and an EVP/ESP egress MAC address, and optionally carries explicit routing information. The routing information includes explicit routing information from an EVP/ESP source ingress node to a destination egress node. Granularity of the explicit routing information has the following two cases: one is specific to egress port information of each node, such as {PE1 node address: port a; P node address: port b; . . . ; PE2 node address}, where the port a is an egress port of the PE1, the port b is an egress port of a P; the other one is merely specific to address information of each node, such as {PE1 node address; P node address; . . . ; PE2 node address}. The following explicit routing information is the same as that described above.

When the explicit routing information is not carried, the PE1 needs to query the layer 2 routing table according to the EVP/ESP egress MAC address, and send a Talker Declaration message from a corresponding egress port. When the explicit routing information including the egress port is carried, the PE1 merely needs to send the Talker Declaration message from the corresponding egress port according to the explicit routing information. When the explicit routing information merely including the node address is carried, the PE1 queries the layer 2 routing table according to the egress MAC address used as the destination address, and then sends the Talker Declaration message through the egress port obtained through querying the table.

The message may be sent through the following two manners. In the first manner, the EVP/ESP ingress MAC address may be used as an Ethernet frame SA (Source Address, source address) of the SRP message, the EVP/ESP egress MAC address is used as an Ethernet frame DA (destination address) of the SRP message, and then the SRP message is extended to carry the EVP/ESP ID; or the EVP/ESP ID is carried in the SRP message as a Stream ID, or the EVP/ESP ID and the EVP/ESP egress MAC address are carried in the SRP message as a Stream ID. The advantage of carrying the information is that, even if there is an intermediate layer 2 node that does not support the SRP, the SRP message can still be delivered continuously.

Alternatively, in the second manner, because the PE1 knows an MAC address of each node, the PE1 may query the layer 2 routing table according to the EVP/ESP egress MAC address used as the destination address to obtain an egress port and MAC address towards a next hop (for example, P node) of the PE2, and then use the MAC address of the PE1 node as the Ethernet frame SA (optionally, the MAC address of the next hop is used as the Ethernet frame DA of the SRP message) of the SRP message to extend the SRP message to carry the EVP/ESP ID, EVP/ESP ingress MAC address and EVP/ESP egress MAC address or merely extend the SRP message to carry the EVP/ESP ingress MAC address, and carry the EVP/ESP egress MAC address and the EVP/ESP ID as the Stream ID in the SRP message.

In S1130, when the Talker Declaration message passes through the P node (an intermediate node device), the P node queries the layer 2 routing table according to the EVP/ESP egress MAC address carried in the SRP message, or according to the explicit routing information, forwards the Talker Declaration message from the corresponding egress port. Optionally, the P node saves a path state, such as the MAC address of the previous hop node or corresponding port information, that is, the previous hop node registration is performed.

In the second manner of S1120, it is also required to query the layer 2 routing table according to the EVP/ESP egress MAC address to obtain an egress port and the MAC address of a next hop of the P node, and then use the MAC address of the P node as the Ethernet frame SA (optionally, the next hop (for example, the PE2 node) MAC address is used as the Ethernet frame DA of the SRP message) of the SRP message, and forward the Talker Declaration message from the corresponding egress port.

In S1140, the PE2 receives the talker Declaration message, performs an EVP layer 2 resource reservation according to the EVP ID, or performs an ESP layer 2 resource reservation according to the ESP ingress MAC address, ESP ID and the ESP egress MAC address, and then saves the reservation state and allocates the corresponding VID/I-SID (label identification information) for the EVP/ESP. Optionally, the PE2 saves the path state, such as the MAC address of the previous hop node or the corresponding port information, that is, the previous hop node registration is performed.

In S1150, the PE2 queries the layer 2 routing table according to the EVP/ESP ingress MAC address, and returns the Listener Declaration message from the corresponding egress port. Here, by using a two-way symmetry property of the shortest path calculated through the IS-IS, it is ensured that the Listener Declaration message returns along the same path through which the Talker Declaration message is sent.

Alternatively, the Listener Declaration message may be returned upstream along the same path according to the previous hop information stored by the PE2.

The message may be returned through the following two manners. In the first manner, the EVP/ESP ingress MAC address may be used as an Ethernet frame DA of the SRP message, the EVP/ESP egress MAC address is used as an Ethernet frame SA of the SRP message, and then the SRP message is extended to carry the EVP/ESP ID and the allocated VID/I-SID; or the SRP message is merely extended to carry the VID/I-SID and the EVP/ESP ID is carried in the SRP message as a Stream ID, or the EVP/ESP egress MAC address and the EVP ID/ESP ID are carried in the SRP message as the Stream ID. The advantage of carrying the information is that, even if there is an intermediate layer 2 node that does not support the SRP, the SRP message can still be delivered continuously.

Alternatively, in the second manner, the PE2 may query the layer 2 routing table according to the EVP/ESP ingress MAC address used as the destination address, or according to the stored previous hop information to obtain an egress port and the MAC address of a previous hop (for example, the P node) of the PE1, and then use the MAC address of the PE2 node as the Ethernet frame SA (optionally, the previous hop MAC address is used as the Ethernet frame DA of the SRP message) of the SRP message to extend the SRP message to carry EVP/ESP ID, the allocated VID/I-SID, the EVP/ESP ingress MAC address and the EVP/ESP egress MAC address or merely extend the SRP message to carry the allocated VID/I-SID and the EVP/ESP ingress MAC address, and carry the EVP/ESP egress MAC address and the EVP ID/ESP ID in the SRP message as the Stream ID.

In S1160, when the Listener Declaration message passes through the P node, the P node performs an EVP layer 2 resource reservation according to the EVP ID, or performs an ESP layer 2 resource reservation according to the ESP ingress MAC address, the VID/I-SID and the egress MAC address, and saves the reservation state; if the resource reservation is successful, a forwarding entry (forwarding entry) formed by the EVP/ESP egress MAC address and the VID/I-SID is established in a layer 2 forwarding table.

The forwarding entry may queries the layer 2 routing table according to the EVP/ESP egress MAC address carried in the SRP message to obtain an egress port, and the egress port is used as an egress port corresponding to the forwarding entry formed by the EVP/ESP egress MAC address and the VID/I-SID; or an ingress port of the Listener Declaration message may be used as an ingress port corresponding to the forwarding entry formed by the EVP/ESP ingress MAC address and the VID/I-SID.

In S1170, the P node forwards the Listener Declaration message.

Specifically, the P node queries the layer 2 routing table according to the EVP/ESP ingress MAC address, and forwards the Listener Declaration message from the corresponding egress port. Here, by using a two-way symmetry property of the shortest path calculated through the IS-IS, it is ensured that the Listener Declaration message returns along the same path through which the Talker Declaration message is sent.

Alternatively, the Listener Declaration message may be sent upstream according to the previous hop information stored by the P node.

In the second manner of S1150, it is further required to query the layer 2 routing table according to the EVP/ESP ingress MAC address used as the destination address, or according to the stored previous hop information to obtain the egress port and the MAC address of the previous hop (for example, the PE node), and then use the MAC address of the P node as the Ethernet frame SA (optionally, the previous hop MAC address is used as the Ethernet frame DA of the SRP message) of the SRP message, and forward the message from the corresponding egress port.

In S1180, when the Listener Declaration message reaches the PE1 node, an EVP layer 2 resource reservation is performed according to the EVP ID, or an ESP layer 2 resource reservation is preformed according to the ESP ingress MAC address, the VID/I-SID and the ESP egress MAC address, and the reservation state is saved. If the ESP is successfully created, the ESP ID is bound to the ESP egress MAC address+the VID/I-SID, that is, the ESP egress MAC address+the VID/I-SID are used as the ETH label of the ESP, or the EVP ID is bound to the VID/I-SID. A forwarding entry formed by the EVP/ESP egress MAC address and the VID/I-SID is established in a layer 2 forwarding table.

The forwarding entry may query the layer 2 routing table according to the EVP/ESP egress MAC address carried in the SRP message to obtain an egress port, and the egress port is used as an egress port corresponding to the forwarding entry formed by the EVP/ESP egress MAC address and the VID/I-SID. Alternatively, an ingress port of the Listener Declaration message is used as an ingress port corresponding to the forwarding entry formed by the EVP/ESP egress MAC address and the VID/I-SID.

In this way, through the method 200, the ETH label allocation is implemented and the EVP and/or ESP is established, and the node device is still maintained as a layer 2 device, thus reducing the complexity and improvement cost of network access.

Figure 12:
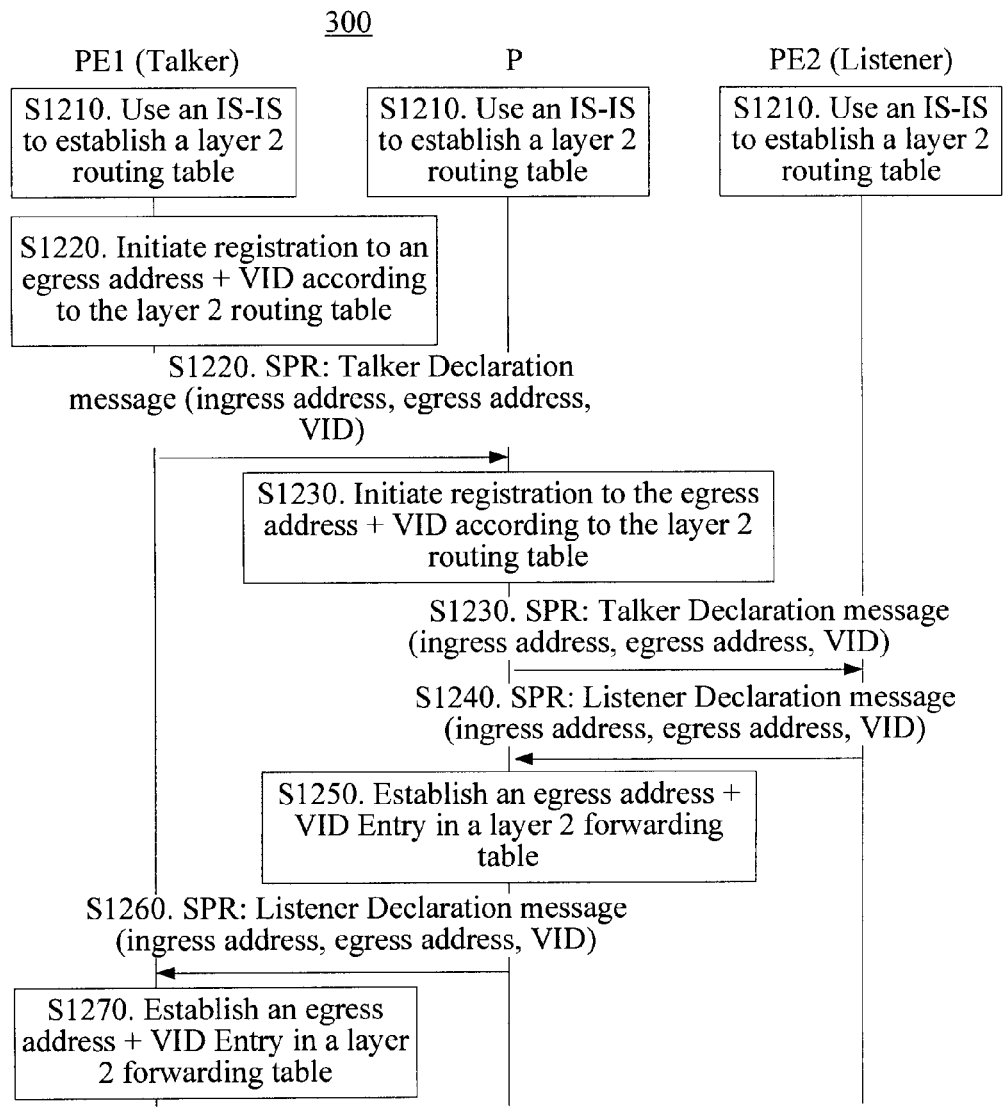

FIG. 12 illustrates a flow chart of a method 300 for allocating an ETH label by extending a layer 2 resource reservation protocol (for example, an SRP protocol).

As shown in FIG. 12, in the method 300, an EVP/ESP source node PE1 (a source node device) allocates a VID/I-SID (label identification information) corresponding to the EVP/ESP, thus singly forming the ETH label or further forming the ETH label together with an ESP egress MAC address.

The layer 2 resource reservation protocol (for example, an SRP) is extended, and an ESP ingress MAC address (or an Ingress Nickname), a VID/I-SID and an ESP egress MAC address (or an Egress Nickname) are carried, through which one ESP is identified uniquely; or the layer 2 resource reservation protocol (for example, an SRP) is extended, and an EVP ingress MAC address (or an Ingress Nickname), a VID/I-SID and an EVP egress MAC address (or an Egress Nickname) are carried. The ingress addresses or the egress addresses are layer 2 addresses.

S1210 of the method 300 is basically the same as S1110 in FIG. 11, where layer 2 routing information is exchanged and a layer 2 routing table is established.

In S1220, when it is required to establish an EVP/ESP from the PE1 to a PE2, an EVP/ESP ingress is an MAC address of the PE1, and an EVP/ESP egress is an MAC address of the PE2, the PE1 allocates the VID/I-SID corresponding to the EVP/ESP. The PE1 initiates a layer 2 registration message Talker Declaration (corresponding to the "ETH label allocation message"), which carries the EVP/ESP ingress MAC address, the VID/I-SID and the EVP/ESP egress MAC address and optionally carries explicit routing information.

When the explicit routing information is not carried, the PE1 needs to query the layer 2 routing table according to the EVP/ESP egress MAC address, and send a Talker Declaration message from a corresponding egress port. When the explicit routing information including the egress port is carried, the PE1 merely needs to send the Talker Declaration message from the corresponding egress port according to the explicit routing information. When the explicit routing information merely including the node address is carried, the PE1 queries the layer 2 routing table according to the egress MAC address used as a destination address, and then sends the Talker Declaration message through the egress port obtained through querying the table.

The message may be sent through the following two manners. In the first manner, the EVP/ESP ingress MAC address may be used as an Ethernet frame SA of the SRP message, the EVP/ESP egress MAC address is used as an Ethernet frame DA of the SRP message, and then the VID/I-SID is carried in the SRP message as a Stream ID; or the EVP/ESP egress MAC address and the VID/I-SID are carried in the SRP message as a Stream ID. The advantage of carrying the information is that, even if there is an intermediate layer 2 node that does not support the SRP, the SRP message can still be delivered continuously.

Alternatively, in the second manner, because the PE1 knows the MAC address of each node, the PE1 may query the layer 2 routing table according to the EVP/ESP egress MAC address used as the destination address to obtain an egress port and MAC address towards a next hop (for example, P node) of the PE2, and then use the MAC address of the PE1 node as the Ethernet frame SA (optionally, the next hop MAC address is used as the Ethernet frame DA of the SRP message) of the SRP message to extend the SRP message to carry the VID/I-SID, EVP/ESP ingress MAC address and EVP/ESP egress MAC address or merely extend the SRP message to carry the EVP/ESP ingress MAC address, and carry the EVP/ESP egress MAC address and the VID/I-SID as the Stream ID in the SRP message.

In S1230, when the Talker Declaration message passes through a P node (an intermediate node device), the P node queries the layer 2 routing table according to the EVP/ESP egress MAC address and the VID/I-SID that are carried in the SRP message, or according to the explicit routing information, forwards the Talker Declaration message from the corresponding egress port. Optionally, the P node saves a path state, such as the MAC address of the previous hop node or corresponding port information, that is, the previous hop node registration is performed.

In the second manner of S1220, it is also required to query the layer 2 routing table according to the EVP/ESP egress MAC address and the VID/I-SID to obtain an egress port and the MAC address of a next hop of the P node, and then use the MAC address of the P node as the Ethernet frame SA (optionally, the next hop (for example, the PE2 node) MAC address is used as the Ethernet frame DA of the SRP message) of the SRP message, and forward the Talker Declaration message from the corresponding egress port.

In S1240, the PE2 (a terminal node device) receives the Talker Declaration message, performs an EVP layer 2 resource reservation according to the VID/I-SID, or performs an ESP layer 2 resource reservation according to the ESP ingress MAC address, the VID/I-SID and the ESP egress MAC address, and a reservation state is saved. Optionally, the path state is saved, such as the MAC address of the previous hop node or the corresponding port information, that is, the previous hop node registration is performed.

Then, the PE2 queries the layer 2 routing table according to the EVP/ESP ingress MAC address, and returns the Listener Declaration message from the corresponding egress port. Here, by using a two-way symmetry property of a shortest path calculated through an IS-IS, it is ensured that the Listener Declaration message returns along the same path through which the Talker Declaration message is sent.

Alternatively, the Listener Declaration message may be returned upstream along the same path according to the previous hop information stored by the PE2.

The message may be returned through the following two manners. In the first manner, the EVP/ESP ingress MAC address may be used as an Ethernet frame DA of the SRP message, the EVP/ESP egress MAC address is used as an Ethernet frame SA of the SRP message, and then the EVP/ESP egress MAC address and the VID/I-SID are carried in the SRP message as a Stream ID. The advantage of carrying the information is that, even if there is an intermediate layer 2 node that does not support the SRP, the SRP message can still be delivered continuously.

Alternatively, in the second manner, the PE2 may query the layer 2 routing table according to the EVP/ESP ingress MAC address used as the destination address, or according to the stored previous hop information to obtain an egress port and the MAC address of a previous hop (for example, the P node) of the PE1, and then use the MAC address of the PE2 node as the Ethernet frame SA (optionally, the previous hop MAC address is used as the Ethernet frame DA of the SRP message) of the SRP message to extend the SRP message to carry the VID/I-SID, the EVP/ESP ingress MAC address and the EVP/ESP egress MAC address or merely extend the SRP message to carry the allocated VID/I-SID and the EVP/ESP ingress MAC address, and carry the EVP/ESP egress MAC address and the VIDA-SID in the SRP message as the Stream ID.

In S1250, when the Listener Declaration message passes through the P node, an EVP layer 2 resource reservation is performed according to the EVP ID, or an ESP layer 2 resource reservation is performed according to the ESP ingress MAC address, the VID/I-SID and the ESP egress MAC address, and the reservation state is saved. If the resource reservation is successful, a forwarding entry (forwarding entry) formed by the EVP/ESP egress MAC address and the VID/I-SID is established in the layer 2 forwarding table.

The forwarding entry may query the layer 2 routing table according to the EVP/ESP egress MAC address and the VID/I-SID that are carried in the SRP message to obtain an egress port, and the egress port is used as an egress port corresponding to the forwarding entry formed by the EVP/ESP egress MAC address and the VID/I-SID. Alternatively, an ingress port of the Listener Declaration message is used as an ingress port corresponding to the forwarding entry formed by the EVP/ESP egress MAC address and the VID/I-SID.

S1260 is basically the same as S1170 in FIG. 11.

In S1270, when the Listener Declaration message reaches the PE1 node, an EVP layer 2 resource reservation is performed according to the VID/I-SID, or an ESP layer 2 resource reservation is performed according to the ESP ingress MAC address, the VID/I-SID and the ESP egress MAC address, and the reservation state is saved. A forwarding entry (forwarding entry) formed by the EVP/ESP egress MAC address and the VID/I-SID is established in the layer 2 forwarding table.

The forwarding entry may query the layer 2 routing table according to the EVP/ESP egress MAC address and the VID/I-SID that are carried in the SRP message to obtain an egress port, and the egress port is used as an egress port corresponding to the forwarding entry formed by the EVP/ESP egress MAC address and the VID/I-SID. Alternatively, an ingress port of the Listener Declaration message is used as an ingress port corresponding to the forwarding entry formed by the EVP/ESP egress MAC address and the VID/I-SID.

In this way, through the method 300, the ETH label allocation is implemented and the EVP and/or ESP is established, and the node device is still maintained as a layer 2 device, thus reducing the complexity and improvement cost of network access.

Figure 13:
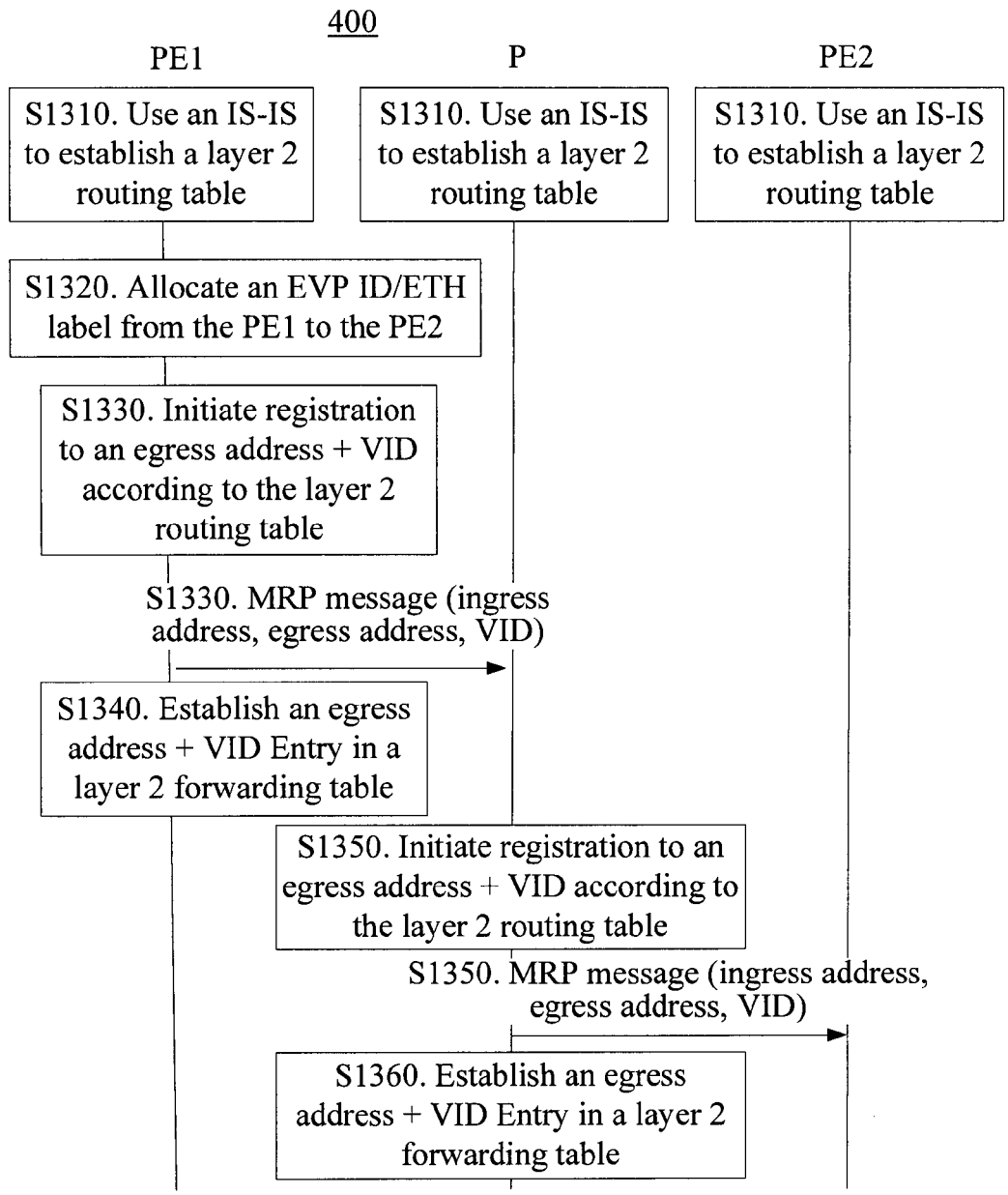

FIG. 13 illustrates a flow chart of a method 400 for allocating an ETH label by extending a layer 2 registration protocol (for example, an MPR protocol).

As shown in FIG. 13, in the method 400, an EVP/ESP source node PE1 (a source node device) allocates a VID/I-SID corresponding to an EVP/ESP, thus singly forming the ETH label or further forming the ETH label together with an ESP egress MAC address.

The layer 2 registration protocol (for example, an MRP) is extended, and an ESP ingress MAC address (or an Ingress Nickname), the VID/I-SID and an ESP egress MAC address (or an Egress Nickname) are carried, through which one ESP is identified uniquely; or the layer 2 registration protocol (for example, an MRP) is extended, and an EVP ingress MAC address (or an Ingress Nickname), the VID/I-SID and an EVP egress MAC address (or an Egress Nickname) are carried. The ingress addresses or the egress addresses are layer 2 addresses.

S1310 of the method 13 is basically the same as S1110 in FIG. 11 and S1210 in FIG. 12, where layer 2 routing information is exchanged and a layer 2 routing table is established.

In S1320, when it is required to establish an EVP/ESP from the PE1 (a source node device) to a PE2 (a terminal node device), an EVP/ESP ingress is an MAC address of the PE1, and an EVP/ESP egress is an MAC address of the PE2, the PE1 allocates the VID/I-SID (label identification information) corresponding to the EVP/ESP.

In S1330, the PE1 initiates a layer 2 registration message (corresponding to the "ETH label allocation message"), which carries the EVP/ESP ingress MAC address, the VID/I-SID and the EVP/ESP egress MAC address and optionally carries explicit routing information.

When the explicit routing information is not carried, the PE1 needs to query the layer 2 routing table according to the EVP/ESP egress MAC address, and send a layer 2 registration message from a corresponding egress port. When the explicit routing information including the egress port is carried, the PE1 merely needs to send the Talker Declaration message from the corresponding egress port according to the explicit routing information. When the explicit routing information merely including the node address is carried, the PE1 queries the layer 2 routing table according to the egress MAC address used as a destination address, and then sends the Talker Declaration message through the egress port obtained through querying the table.

The message may be sent through the following two manners. In the first manner, the EVP/ESP ingress MAC address is used as an Ethernet frame SA of the layer 2 registration message, the EVP/ESP egress MAC address is used as an Ethernet frame DA of the layer 2 registration message, and the EVP/ESP egress MAC address and/or the VID/I-SID is carried in the layer 2 registration message. The advantage of carrying the information is that, even if there is an intermediate layer 2 node that does not support the layer 2 registration, the layer 2 registration message can still be delivered continuously.

Alternatively, in the second manner, because the PE1 knows the MAC address of each node, the PE1 may query the layer 2 routing table according to the EVP/ESP egress MAC address used as the destination address to obtain the egress port and the MAC address of the next hop (for example, the P node) of the PE2, and then use the MAC address of the PE1 as the Ethernet frame SA (optionally, the next hop Mac address is used as the Ethernet frame DA of the layer 2 registration message) of the layer 2 registration message to extend the layer 2 registration message to carry the VID/I-SID, the EVP/ESP ingress MAC address and the EVP/ESP egress MAC address.

In S1340, a forwarding entry (forwarding entry) formed by the EVP/ESP egress MAC address and the VID/I-SID is established in the layer 2 forwarding table.

The forwarding entry may query the layer 2 routing table according to the EVP/ESP egress MAC address and the VID/I-SID to obtain an egress port, and the egress port is used as an egress port corresponding to the forwarding entry formed by the EVP/ESP egress MAC address and the VID/I-SID.

In S1450, when the layer 2 registration message passes through the P node (an intermediate node device), the P node queries the layer 2 routing table according to the EVP/ESP egress MAC address and the VID/I-SID that are carried in the layer 2 registration message, or according to the explicit routing information, forwards the layer 2 registration message from the corresponding egress port.

In the second manner of S1330, it is also required to query the layer 2 routing table according to the EVP/ESP egress MAC address and the VID/I-SID to obtain an egress port and the MAC address of a next hop of the P node, and then use the MAC address of the P node as the Ethernet frame SA (optionally, the next hop (for example, the PE2 node) MAC address is used as the Ethernet frame DA of the SRP message) of the layer 2 registration message, and forward the layer 2 registration message from the corresponding egress port.

S1360 is similar to S1340, where a forwarding entry (forwarding entry) formed by the EVP/ESP egress MAC address and the VID/I-SID is established in the layer 2 forwarding table by the P node.

Another direction is an EVP/ESP establishing process from the PE2 to the PE1, which is similar to the processes in foregoing steps S1310 to S1360, where the MRP message or the Listener Declaration message of the SRP may be used to allocate the ETH label.

In this way, through the method 400, the ETH label allocation is implemented and the EVP/ESP is established, and the node device is still maintained as a layer 2 device, thus reducing the complexity and improvement cost of network access.

Back to FIG. 3, according to an embodiment of the present invention, in the case that the PW label is allocated through the layer 2 label allocation protocol, in S110, specifically, the PE1 (a source) may generate a PW label allocation message according to the layer 2 label allocation protocol, and send the PW label allocation message, where the PW label allocation message carries a PW ingress address, a PW identifier and a PW egress address. When the PW label allocation message is received, the PE2 (a terminal) allocates the PW label according to the PW label allocation message. After the PW label is obtained, the PE1 is bound to the PW identifier and the PW label.

Figure 14:
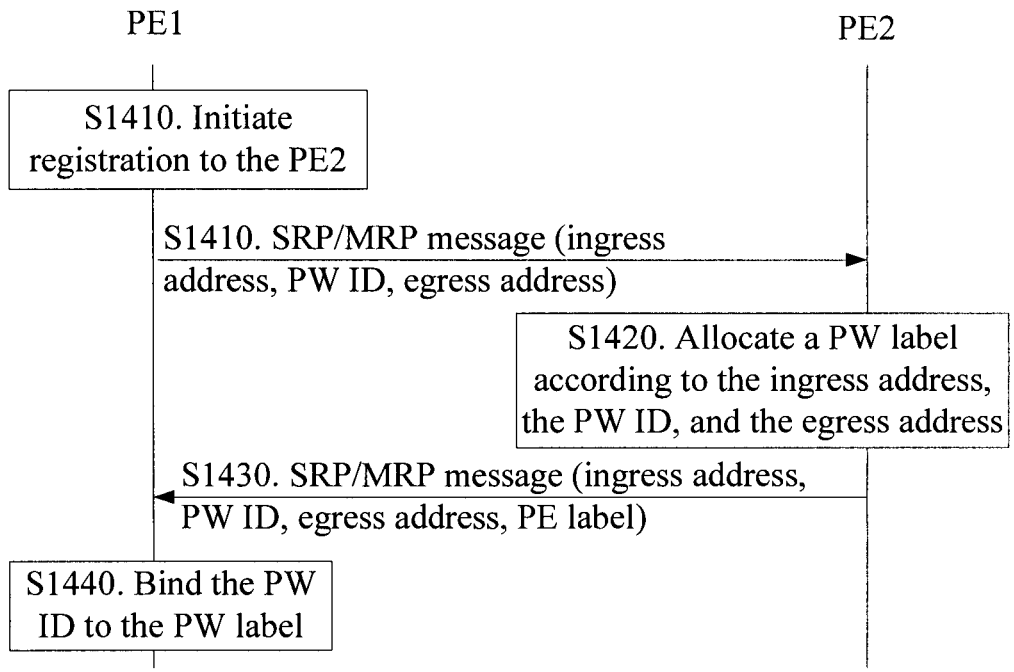
FIG. 14 is a schematic diagram of an embodiment of allocating a PW label.

In the following, an embodiment corresponding to the method for allocating a PW label in FIG. 3 is described with reference to the accompanying drawings and examples. FIG. 14 illustrates a flow chart of allocating a PW label by extending a layer 2 resource reservation protocol or a layer 2 registration protocol (an SRP or an MRP).

In the method, a PW source node PE1 initiates a PW ID, and a PW terminal node (PE2) allocates a PW label corresponding to the PW ID. In this embodiment, the PW may correspond to an EVC.

The layer 2 resource reservation protocol (for example, the SRP) or the layer 2 registration protocol (for example, the MRP) is extended, and the PW ingress address, the PW identifier and the PW egress address are carried. The PW ingress address may be a PW ingress MAC address or an Ingress Nickname. The PW identifier may be a PW ID. The PW egress address may be a PW egress MAC address or an Egress Nickname.

In S1410, when it is required to establish a PW/EVC from a PE1 to a PE2, a PW/EVC ingress is an MAC address of the PE1, and a PW/EVC egress is an MAC address of the PE2, the PE1 initiates a layer 2 registration message (corresponding to a "PW label allocation message") to the PW/EVC egress MAC address, which carries a PW ingress MAC address, a PW ID/EVC ID and a PW ingress MAC address.

The PW/EVC ingress MAC address may be used as an Ethernet frame SA of the layer 2 registration message and the PW/EVC egress MAC address is used as an Ethernet frame DA of the layer 2 registration message to extend the PW ID/EVC ID carried in the layer 2 registration message.

If a P node exists between the PE1 and the PE2, the P node may search and find that the received layer 2 registration message is used for PW/EVC negotiation, and directly forward the massage without processing.

In S1420, when the PE2 receives the layer 2 registration message, the PE2 allocates the corresponding PW label according to the PW/EVC ingress address, the PW ID/EVC ID, and the PW/EVC egress address that are carried in the message. When the EVC is used as the PW, the PW label is generally the I-SID/VID.

Then, in S1430, the PE2 may use the PW/EVC ingress MAC address as an Ethernet frame DA of a layer 2 resource reservation protocol or a layer 2 registration message according to the layer 2 resource reservation protocol or the layer 2 registration message, use the PW/EVC egress MAC address as an Ethernet frame SA of the layer 2 resource reservation protocol or the layer 2 registration message, to extend the PW ID/EVC ID and the allocated PW label that are carried in the layer 2 resource reservation protocol or the layer 2 registration message to return to the PE1.

In S1440, the PE1 binds the PW ID/EVC ID to the PW label.

In this way, the PW label allocation is implemented, and it is not required to upgrade the node device to a device supporting a protocol above layer 3, thus reducing the improvement cost and the complexity.

Figure 15:
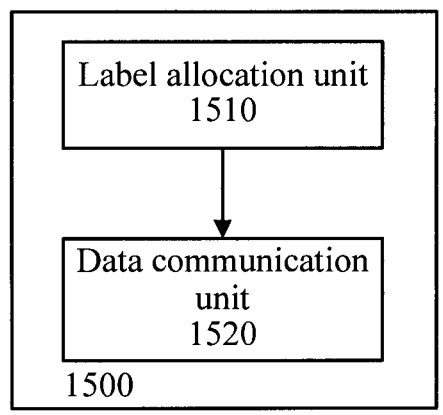
FIG. 15 is a schematic block diagram of a network node device that may implement an embodiment of the present invention.

FIG. 15 is a schematic block diagram of a network node device (including a PE node device and/or a P node device) that may implement an embodiment of the present invention.

As show in FIG. 15, the network node device 1500 may execute the method 100 in FIG. 6. Correspondingly, the device 1500 has a label allocation unit 1510 and a data communication unit 1520. The label allocation unit 1510 is configured to allocate a PW label and/or an ETH label through a layer 2 label allocation protocol; and the data communication unit 1520 is configured to perform data communication according to the allocated PW label and/or the allocated ETH label. The functions and operations of the label allocation unit 1510 and the data communication unit 1520 may correspond to the foregoing methods, which are not described here to avoid repetition.

In this way, according to the embodiment of the present invention, the device 1500 is still a layer 2 device, and may implement the allocation of the PW label and/or the ETH label, thus reducing the complexity and improvement cost of network access.

According to an embodiment of the present invention, the label allocation unit 1510 may include: a layer 2 routing protocol exchange unit, configured to exchange layer 2 routing information and establish a layer 2 routing table according to the layer 2 routing information; a first generating unit, configured to generate an ETH label allocation message conforming to the layer 2 label allocation protocol; and an allocation unit, configured to transmit the ETH label allocation message according to the layer 2 routing table to complete the allocation of the ETH label.

According to an embodiment of the present invention, the label allocation unit 1510 may include: a second generating unit, configured to generate a PW label allocation message according to the layer 2 label allocation protocol and transmit the PW label allocation message to a PW terminal node device, where the PW label allocation message carries a PW ingress address, a PW identifier and a PW egress address; a receiving unit, configured to receive a PW label allocated by the PW terminal node device according to the PW label allocation message; and a binding unit, configured to bind the PW identifier and the PW label.

According to an embodiment of the present invention, the network node device 1500 may further include a PW switching unit, configured to establish a label switching table of PW labels of at least two types, and support the switching of the PW labels of at least two types according to the label switching table.

Figure 16:
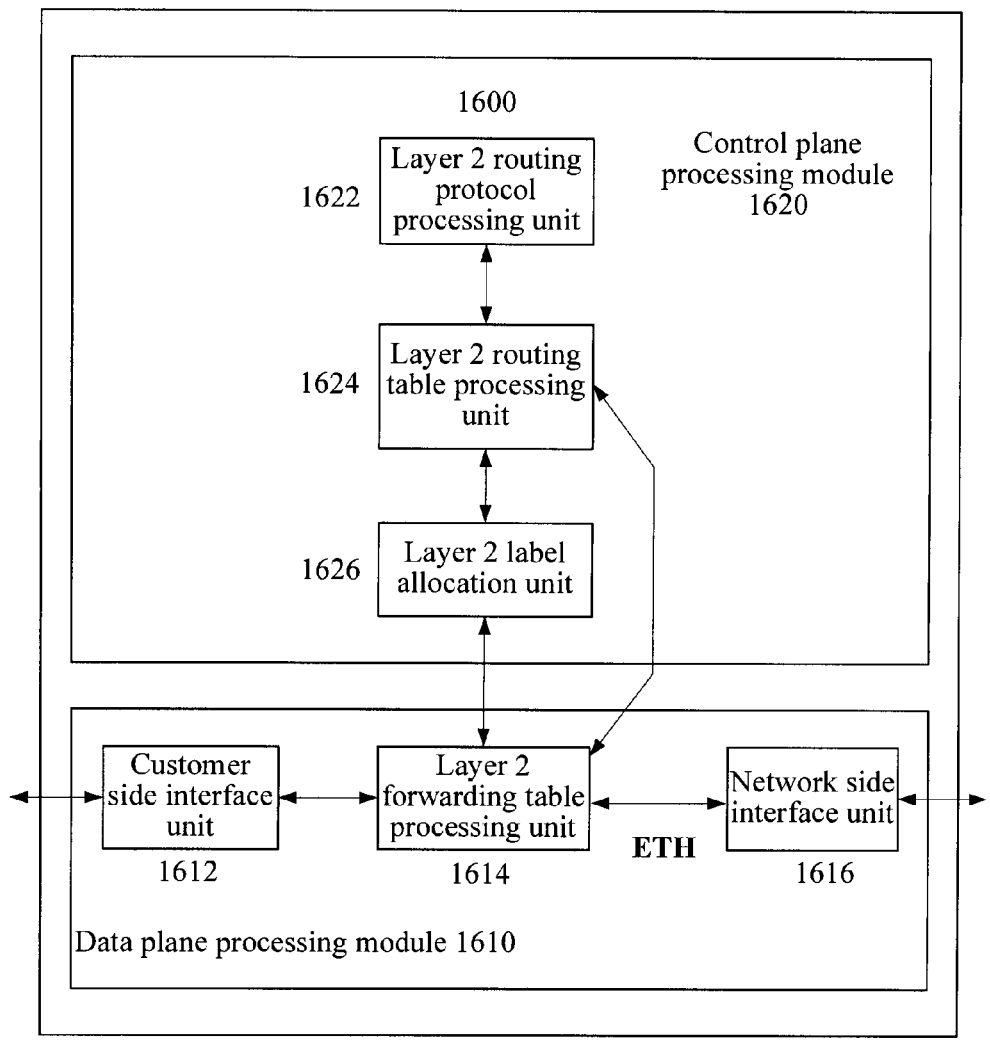
FIG. 16 is a specific functional block diagram of a node device that may apply an embodiment of the present invention.

FIG. 16 is a specific functional block diagram of a network node device according to an embodiment of the present invention. As shown in FIG. 16, a structure of the network node device 1600 may be divided into a data plane (Data Plane) processing module 1610 and a control plane (Control Plane) processing module 1620.

The data plane processing module 1610 may correspond to the data communication unit 1520 in FIG. 15. In this embodiment, the data plane may maintain a current Ethernet forwarding mechanism to disable functions of flooding and MAC address learning. Optionally, processing such as adding, deleting or Trill layer forwarding of a Trill layer packet header is added.

Specifically, the data plane processing module 1610 may include a customer side interface unit 1612, a layer 2 forwarding table processing unit 1614 and a network side interface unit 1616.

The layer 2 forwarding table processing unit 1614 may be configured to store and maintain a layer 2 forwarding table, and implement an ETH forwarding function according to the layer 2 forwarding table; optionally, processing on a Trill layer is correspondingly increased.

The customer side interface processing unit 1612 may implement a communication processing function of a customer side interface.

The network side interface processing unit 1616 may implement a communication processing function of a network side interface.

The control plane processing module 1620 in FIG. 16 may include a layer 2 routing protocol processing unit 1622, a layer 2 routing table processing unit 1624 and a layer 2 label allocation unit 1626. The control plane processing module 1620 may correspond to the label allocation unit 1510 in FIG. 15.

The control plane processing module 1620 exchanges the layer 2 routing information with other network nodes through the layer 2 routing protocol processing unit 1622, so as to establish a layer 2 routing table. The layer 2 routing table is maintained by the layer 2 routing table processing unit 1624.

For example, the layer 2 routing protocol processing unit 1622 may adopt an IS-IS protocol to exchange the layer 2 routing information. Taking a PLSB as an example, by utilizing a basic IS-IS function, each PLSB node uses a link state advertisement (LSA) to inform a directly adjacent node that which node the node is connected to and how to connect these nodes. The advertisement is published among all nodes that support the PLSB, therefore each node in one instance finally shares one common network topology (including a device MAC address and an I-SID). Once all the nodes learn the topology, each node applies an SPF (shortest path first) algorithm, and updates a shortest path obtained through calculation into the layer 2 routing table. In this way, each node establishes a point-to-multipoint shortest path tree with the current node as a root node and from the root node to other nodes in the network.

The control plane processing module 1620 further extends a layer 2 resource reservation protocol (for example, an SRP), a layer 2 registration protocol (for example an MRP), an Ethernet OAM cell, a slow protocol subtype field, and an Ethernet frame EtherType field through the layer 2 label allocation unit 1626 or other manners, to complete the allocation of the PW label, and may further complete the allocation of the ETH label, to establish a corresponding EVP and/or ESP, and establish a layer 2 forwarding table in each PE node and P node.

In this way, according to the embodiment of the present invention, the device 1600 is still a layer 2 device, and may implement the allocation of the PW label and/or ETH label and the establishment of the EVP and/or ESP, thus reducing the complexity and improvement cost of network access.

In the case that the network system according to the embodiments of the present invention and a network system based on a layer 3 protocol such as IP/MPLS exist at the same time, mutual communication between the two network systems needs to be considered.

Figure 17:
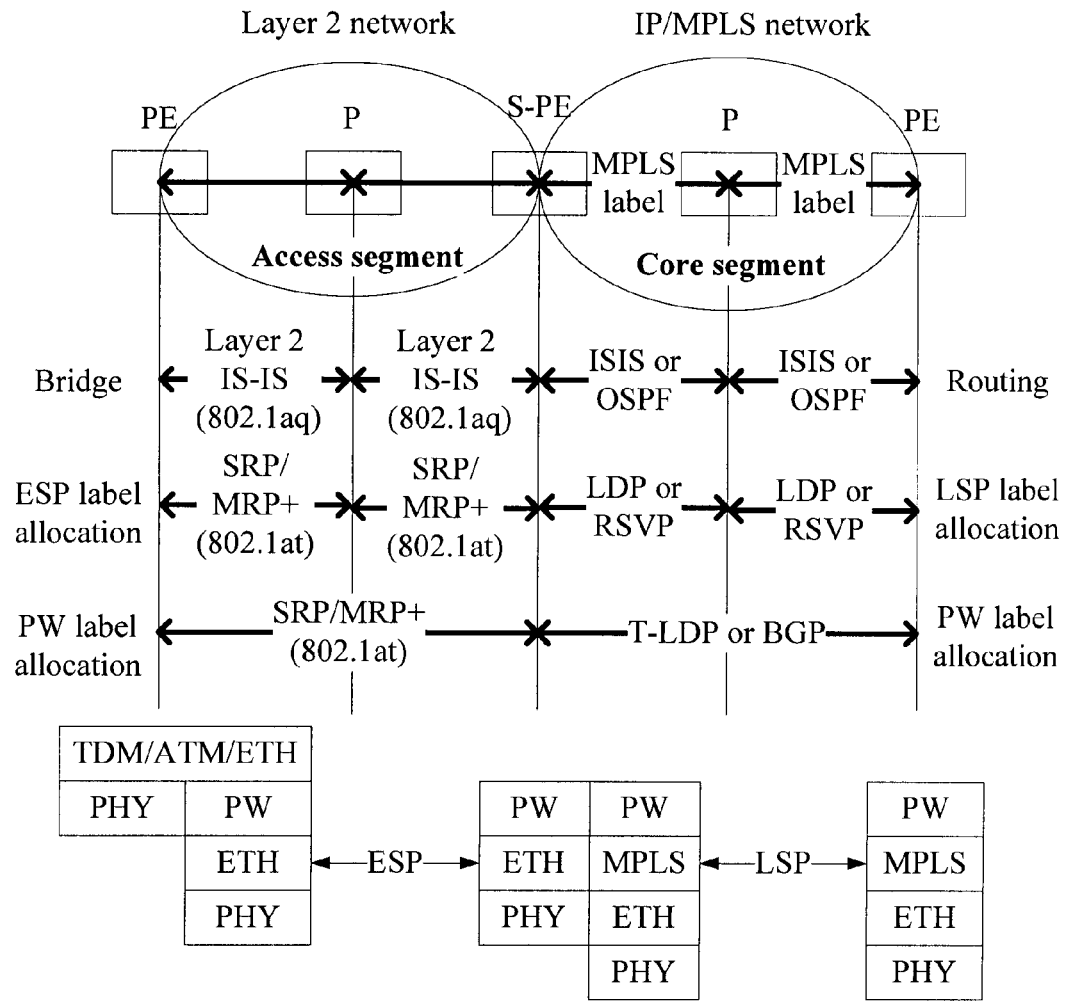
FIG. 17 is a schematic diagram of mutual communication between two networks.

FIG. 17 is a schematic diagram of mutual communication between two networks. FIG. 17 illustrates an exemplary structure of an Ethernet (a layer 2 network) based on the PW and an IP/MPLS network. "LSP" in FIG. 17 means a label switched path (Label Switched Path) known in the field. It should be noted that, the embodiment of the present invention is not limited to the specific network type, the type of each device, and the number of devices.

Generally, the Ethernet based on the PW is applicable to an access network or an Ethernet aggregation network, and the IP/MPLS network is more applicable to a core network. An S-PE (Switching PE, switching provider edge) may be used between two networks for isolation and mutual communication. The S-PE node may establish a label switching table of PW labels of different types, and support the switching of PW labels of different types according to the label switching table.

Figure 18:
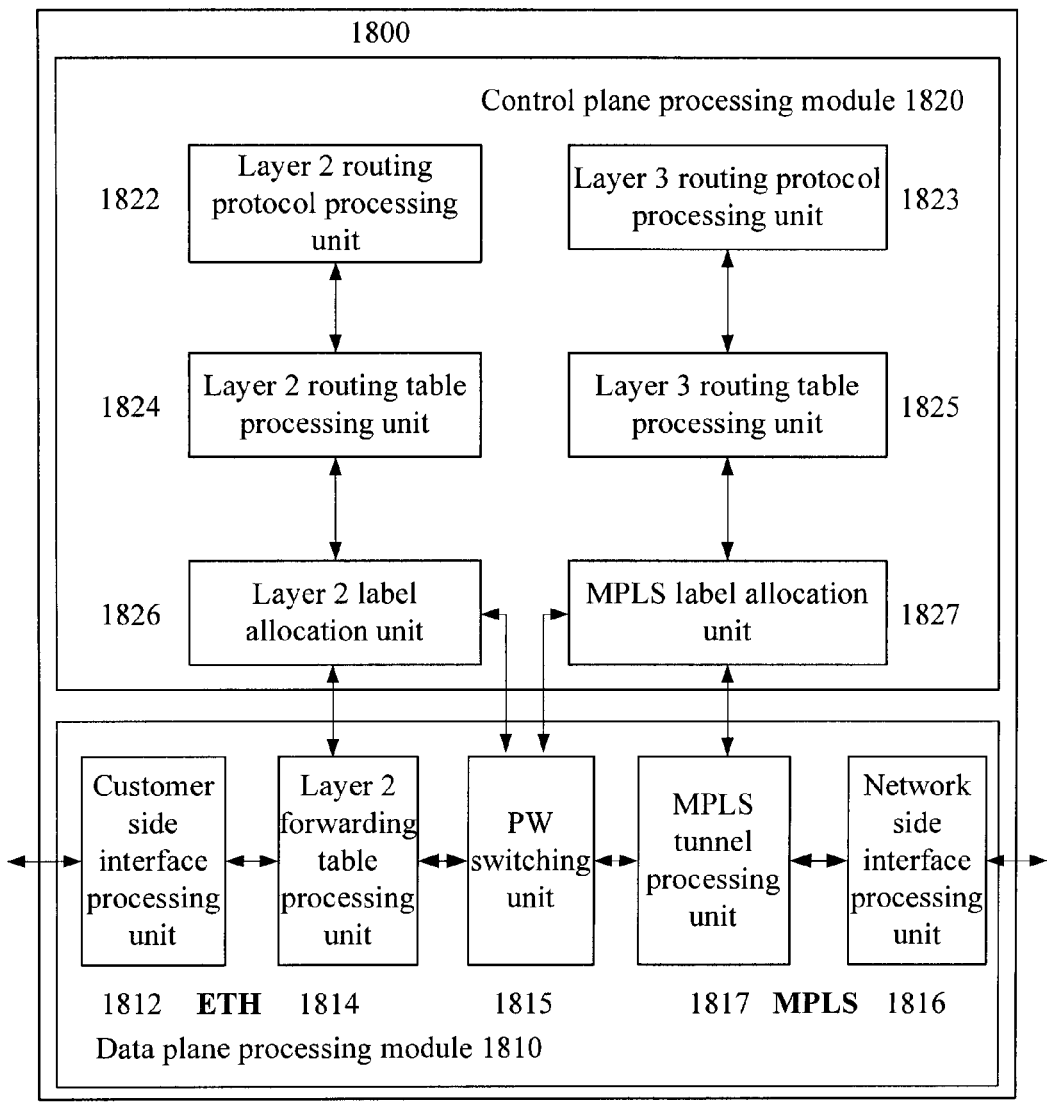
FIG. 18 is a schematic block diagram of a node device.

FIG. 18 is a schematic block diagram of an S-PE node device. As shown in FIG. 18, the S-PE node device 1800 may include a data plane processing module 1810 and a control plane processing module 1820.

The data plane processing module 1810 includes a customer side interface processing unit 1812, a layer 2 forwarding table processing unit 1814, a network side interface processing unit 1816, a PW switching unit 1815, and an MPLS tunnel processing unit 1817. The layer 2 forwarding table processing unit 1814, the customer side interface processing unit 1812, and the network side interface processing unit 1816 are respectively similar to the layer 2 forwarding table processing unit 1614, a customer side interface processing unit 1612, and a network side interface processing unit 1616 of the PE/P node device 1600 in FIG. 16, which are not described here to avoid repetition.

The MPLS tunnel processing unit 1817 is configured to implement encapsulation or decapsulation processing of an MPLS tunnel.

The PW switching processing unit 1815 is configured to implement a mixed PW label switching function, establish a label switching table of PW labels of at least two types, and support the switching of the PW labels according to the label switching table, that is, one PW label is switched into another PW label.

Figure 19:
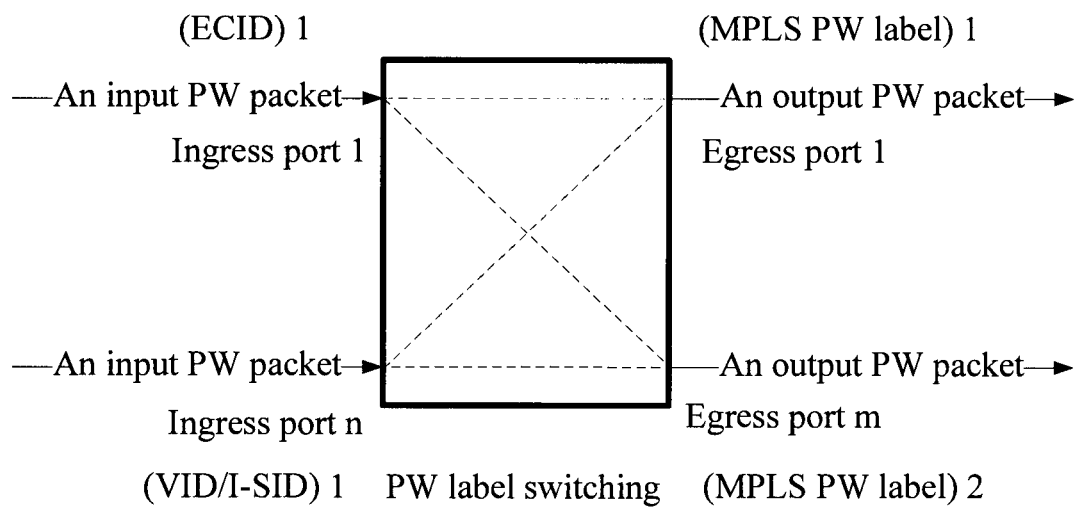
FIG. 19 is a schematic diagram of switch of PW labels of different types.

FIG. 19 illustrates a schematic diagram of PW labels switching of various types. As shown in FIG. 19, switching between an ECID and an MPLS label (may be used as a PW label) may exist, and at this time, the label switching table is as shown in table 2. Switching between the VID/I-SID (may be used as a PW label) and the MPLS label (may be used as a PW label) may exist, and at this time, the label switching table is as shown in table 3. Switching between the VID/I-SID (may be used as a PW label) and the ECID may also be performed. An Ingress Interface is an ingress port, and an Egress Interface is an egress port.

TABLE 2

Switching table between an ECID and an MPLS label

| Ingress Interface | Ingress Label | Egress Interface | Egress Label |
|---|---|---|---|
| 1 | ECID1 | 1 | MPLS label1 |
| 2 | MPLS label 2 | 2 | ECID2 |
| ... | | | |

TABLE 3

Switching table between a VID/I-SID and an MPLS label

| Ingress Interface | Ingress Label | Egress Interface | Egress Label |
|---|---|---|---|
| 1 | VID/I-SID 1 | 1 | MPLS label1 |
| 2 | MPLS label 2 | 2 | VID/I-SID 2 |
| ... | | | |

Taking the switching between the ECID and the MPLS label (may be used as a PW label) as an example, a label switching forwarding function is specifically as follows.

When an ETH frame reaches an S-PE, a PW switching unit queries the switching table according to the ingress port (for example, an ingress port 2) of the ETH frame and an ingress label (for example, an ECID1) to obtain an egress port (for example, an egress port 1) and egress label (for example, an MPLS label 1). Then, the PW switching unit removes an Ethertype field and an ECID field, and then adds an MPLS packet header, and optionally needs to modify a CW field based on the ECID into a CW field based on the MPLS, where the MPLS label is a queried egress label value (for example, an MPLS label 1), and delivers the MPLS packet from the egress port 1.

When an MPLS packet reaches the S-PE, a PW switching unit queries the switching table according to an ingress port (for example, an ingress port 2) of the MPLS packet and an ingress label (for example, an MPLS label 2) to obtain an egress port (for example, an egress port 2) and egress label (for example, an ECID2). Then, the PW switching unit removes an MPLS packet header and adds an Ethertype field and an ECID field, and optionally needs to modify a CW field based on the MPLS into a CW field based on the ECID, where the ECID is a queried egress label value (for example, an ECID2), and encapsulates the ECID into an ETH frame and delivers the ETH frame from the egress port 2.

A switching process between the VID/I-SID and the MPLS label is similar to the foregoing process, and it is merely required to replace the ECID with the VID/I-SID.

Referring to FIG. 18, the control plane processing module 1820 includes a layer 2 routing protocol processing unit 1822, a layer 2 routing table processing unit 1824, a layer 2 label allocation unit 1826, a layer 3 routing protocol processing unit 1823, a layer 3 routing table processing unit 1825, and an MPLS label allocation unit 1827.

The layer 2 routing protocol processing unit 1822, the layer 2 routing table processing unit 1824 and the layer 2 label allocation unit 1826 are respectively similar to the layer 2 routing protocol processing unit 1622, the layer 2 routing table processing unit 1624 and the layer 2 label allocation unit 1626 of the PE/P node device 1600 in FIG. 16, which are not described here to avoid repetition.

The layer 3 routing protocol processing unit 1823 exchanges layer 3 routing information with an IP/MPLS network node, so as to establish the routing table. The layer 3 routing table is maintained by the layer 3 routing table processing unit 1825.

The MPLS label allocation unit 1827 is configured to exchange binding information of the MPLS label for the routing with the IP/MPLS network node through an MPLS label allocation protocol such as an LDP (Label Distribution Protocol, label distribution protocol), so as to establish an MPLS label switching table.

In this way, according to the embodiment of the present invention, mixed PW label switching may be further implemented, so as to implement isolation and mutual communication between two networks.

Persons of ordinary skill in the art may realize that, in combination with the embodiments disclosed here, units and algorithm steps of each described example can be implemented with electronic hardware, computer software, or the combination of the electronic hardware and computer software. In order to clearly describe the interchangeability between the hardware and the software, compositions and steps of each example have been generally described according to functions in the foregoing descriptions. Whether these functions are executed in a mode of hardware or software depends on particular applications and design constraint conditions of the technical solutions. Persons skilled in the art may use different methods to implement the described functions for each particular application, but it should not be considered that the implementation goes beyond the scope of the present invention.

Those of ordinary skill in the art may understand that all or part of the steps of the method according to the foregoing embodiments of the present invention may be implemented by a program instructing relevant hardware. The program may be stored in a computer readable storage medium, and the storage medium may be a ROM/RAM, a magnetic disk or an optical disk.

The foregoing descriptions are merely exemplary embodiments of the present invention, but are not intended to limit the protection scope of the present invention. Any modification, equivalent replacement, or improvement made within the spirit and principle of the present invention should fall within the protection scope of the present invention.

What is claimed is:
1. A network communication method, comprising operating at layer 2 (L2) only, by performing:
 allocating an Ethernet (ETH) label through a layer 2 label allocation protocol on a L2 control plane; and
 performing data communication to another network node according to the allocated ETH label under control of the L2 control plane;

wherein the allocating the ETH label through the layer 2 label allocation protocol on the L2 control plane, comprises:
exchanging layer 2 routing information on the L2 control plane between a terminal node device and an intermediate node device, and establishing a layer 2 routing table on the L2 control plane according to the layer 2 routing information;
generating an ETH label allocation message conforming to the layer 2 label allocation protocol; and
transmitting the ETH label allocation message on the L2 control plane according to the layer 2 routing table, so as to complete the allocation of the ETH label;
wherein the layer 2 label allocation protocol comprises an Ethernet header, a Label Management Type field, an Ingress MAC Address field, a Data Path ID field, an Egress MAC Address field, a Label Type field and a Label field, the Ethernet header comprises a destination address, a source address and a Ethernet Type, the Label Management Type field is used to indicate that the message is used in label allocation, the Ingress MAC Address field carries a layer 2 address of a source node device, the Egress MAC Address field carries a layer 2 address of the terminal node device, the Label Type field is used to indicate a type of the Data Path ID field and a type of the Label field, the type of the Data Path ID field is Ethernet Virtual Path or Ethernet Switched Path, the Label field forms the ETH label, or the Label field and the layer 2 address of the terminal node device form the ETH label, or the Label field, the layer 2 address of the source node device and the layer 2 address of the terminal node device form the ETH label.

2. The method according to claim 1, wherein the performing data communication according to the allocated ETH label comprises:
according to the layer 2 routing table and the ETH label, establishing an Ethernet virtual path or an Ethernet switched path, and a corresponding layer 2 forwarding table; and
performing data communication according to the Ethernet virtual path or the Ethernet switched path.

3. The method according to claim 1,
wherein, the transmitting the ETH label allocation message according to the layer 2 routing table, so as to complete the allocation of the ETH label comprises:
querying the layer 2 routing table according to the layer 2 address of the terminal node device, so as to transmit the ETH label allocation message to the terminal node device; and
receiving label identification information allocated by the terminal node device according to the ETH label allocation message.

4. The method according to claim 3, further comprising:
establishing, by the intermediate node device and the source node device, a forwarding entry of the ETH label in respective layer 2 forwarding tables.

5. The method according to claim 1,
wherein, the transmitting the ETH label allocation message according to the layer 2 routing table, so as to complete the allocation of the ETH label comprises:
querying the layer 2 routing table according to the layer 2 address of the terminal node device, so as to transmit the ETH label allocation message to the terminal node device.

6. The method according to claim 5, further comprising:
establishing, by the intermediate node device and the source node device, a forwarding entry of the ETH label in respective layer 2 forwarding tables.

7. The method according to claim 1, wherein the exchanging the layer 2 routing information comprises: exchanging the layer 2 routing information through an intermediate system to intermediate system routing protocol.

8. A network node device, comprising:
a processor and memory, the memory including code instructions configuring the processor to perform operations at layer 2 (L2) only, which comprises:
a label allocation unit, configured to allocate an ETH label through a layer 2 label allocation protocol on a L2 control plane, wherein the allocating unit performs:
exchanging layer 2 routing information on the L2 control plane between a terminal node device and an intermediate node device, and establishing a layer 2 routing table on the L2 control plane according to the layer 2 routing information;
generating an ETH label allocation message conforming to the layer 2 label allocation protocol; and
transmitting the ETH label allocation message on the L2 control plane according to the layer 2 routing table to complete the allocation of the ETH label; and
a data communication unit, configured to perform data communication according to the allocated ETH label under donctrol of the L2 control plane;
wherein the layer 2 label allocation protocol comprises an Ethernet header, a Label Management Type field, an Ingress MAC Address field, a Data Path ID field, an Egress MAC Address field, a Label Type field and a Label field, the Ethernet header comprises a destination address, a source address and a Ethernet Type, the Label Management Type field is used to indicate that the message is used in label allocation, the Ingress MAC Address field carries a layer 2 address of a source node device, the Egress MAC Address field carries a layer 2 address of the terminal node device, the Label Type field is used to indicate a type of the Data Path ID field and a type of the Label field, the type of the Data Path ID field is Ethernet Virtual Path or Ethernet Switched Path, the Label field forms the ETH label, or the Label field and the layer 2 address of the terminal node device form the ETH label, or the Label field, the layer 2 address of the source node device and the layer 2 address of the terminal node device form the ETH label.

9. The device according to claim 8, wherein the label allocation unit comprises:
a layer 2 routing protocol exchange unit, configured to exchange layer 2 routing information, and establish a layer 2 routing table according to the layer 2 routing information;
a generating unit, configured to generate an ETH label allocation message conforming to the layer 2 label allocation protocol; and
an allocation unit, configured to transmit the ETH label allocation message according to the layer 2 routing table, so as to complete the allocation of the ETH label.

10. The device according to claim 8, wherein the layer 2 label allocation protocol is implemented by extending a layer 2 resource reservation protocol, a layer 2 registration protocol, an Ethernet OAM cell, a slow protocol subtype field, or an Ethernet frame EtherType field.

11. A non-transitory computer readable medium, comprising computer-executable instructions that, when executed by a computer processor, cause the computer processor to execute at layer 2 (L2) only, by performing the following:
    allocating an Ethernet (ETH) label through a layer 2 label allocation protocol on a L2 control plane; and
    performing data communication to another network node according to the allocated ETH label under control of the L2 control plane;
wherein the allocating the ETH label through the layer 2 label allocation protocol on the L2 control plane comprises:
    exchanging layer 2 routing information on the control plane between a terminal node device and an intermediate node device, and establishing a layer 2 routing table on the L2 control plane according to the layer 2 routing information;
    generating an ETH label allocation message conforming to the layer 2 label allocation protocol; and
        transmitting the ETH label allocation message on the L2 control plane according to the layer 2 routing table, so as to complete the allocation of the ETH label;
    wherein the layer 2 label allocation protocol comprises an Ethernet header, a Label Management Type field, an Ingress MAC Address field, a Data Path ID field, an Egress MAC Address field, a Label Type field and a Label field, the Ethernet header comprises a destination address, a source address and a Ethernet Type, the Label Management Type field is used to indicate that the message is used in label allocation, the Ingress MAC Address field carries a layer 2 address of a source node device, the Egress MAC Address field carries a layer 2 address of the terminal node device, the Label Type field is used to indicate a type of the Data Path ID field and a type of the Label field, the type of the Data Path ID field is Ethernet Virtual Path or Ethernet Switched Path, the Label field forms the ETH label, or the Label field and the layer 2 address of the terminal node device form the ETH label, or the Label field, the layer 2 address of the source node device and the layer 2 address of the terminal node device form the ETH label.

12. The computer readable medium according to claim 11, wherein the performing data communication according to the allocated ETH label comprises:
    according to the layer 2 routing table and the ETH label, establishing an Ethernet virtual path or an Ethernet switched path, and a corresponding layer 2 forwarding table; and
    performing data communication according to the Ethernet virtual path or the Ethernet switched path.

13. The computer readable medium according to claim 11, wherein, the transmitting the ETH label allocation message according to the layer 2 routing table, so as to complete the allocation of the ETH label comprises:
    querying the layer 2 routing table according to the layer 2 address of the terminal node device, so as to transmit the ETH label allocation message to the terminal node device; and
    receiving label identification information allocated by the terminal node device according to the ETH label allocation message.

14. The computer readable medium according to claim 13, wherein the computer processor further executes:
    establishing, by the intermediate node device and the source node device, a forwarding entry of the ETH label in respective layer 2 forwarding tables.

15. The computer readable medium according to claim 11, wherein, the transmitting the ETH label allocation message according to the layer 2 routing table, so as to complete the allocation of the ETH label comprises:
    querying the layer 2 routing table according to the layer 2 address of the terminal node device, so as to transmit the ETH label allocation message to the terminal node device.

16. The computer readable medium according to claim 15, wherein the computer processor further executes:
    establishing, by the intermediate node device and the source node device, a forwarding entry of the ETH label in respective layer 2 forwarding tables.

17. The computer readable medium according to claim 11, wherein the exchanging the layer 2 routing information comprises: exchanging the layer 2 routing information through an intermediate system to intermediate system routing protocol.

* * * * *